US010045298B2

(12) United States Patent
Seok et al.

(10) Patent No.: US 10,045,298 B2
(45) Date of Patent: *Aug. 7, 2018

(54) METHODS OF TRANSMITTING AND RECEIVING FRAME BY STATION OPERATING IN POWER SAVE MODE IN WIRELESS LAN SYSTEM AND APPARATUS FOR SUPPORTING SAME

(71) Applicant: LG Electronics Inc., Seoul (KR)

(72) Inventors: Yong Ho Seok, Anyang-si (KR); Hyang Sun You, Anyang-si (KR); Jong Hyun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,124

(22) Filed: Jun. 8, 2017

(65) Prior Publication Data
US 2017/0273023 A1 Sep. 21, 2017

Related U.S. Application Data

(63) Continuation of application No. 14/356,068, filed as application No. PCT/KR2012/009796 on Nov. 19, 2012, now Pat. No. 9,699,734.
(Continued)

(51) Int. Cl.
*H04W 52/02* (2009.01)
*H04W 74/08* (2009.01)
(Continued)

(52) U.S. Cl.
CPC ... *H04W 52/0229* (2013.01); *H04W 52/0216* (2013.01); *H04W 74/08* (2013.01);
(Continued)

(58) Field of Classification Search
None
See application file for complete search history.

(56) References Cited

U.S. PATENT DOCUMENTS 7,161,951 B1  1/2007  Sherman
8,010,168 B2  8/2011  Benveniste
(Continued)

FOREIGN PATENT DOCUMENTS

CN  101390326 A  3/2009
EP    1903720 A1  3/2008
(Continued)

OTHER PUBLICATIONS

IEEE 802.11 Tutorial: Mustafa Ergen, University of California Berkeley, Jun. 2002.

*Primary Examiner* — Ayaz R Sheikh
*Assistant Examiner* — Tarell A Hampton
(74) *Attorney, Agent, or Firm* — Dentons US LLP

(57) ABSTRACT

The present invention relates to methods of transmitting and receiving a frame, which are performed by a station operating in a power save mode in a wireless LAN system. The method includes: transmitting a poll frame requesting the transmission of a buffered frame to an access point AP, wherein the poll frame includes a sustain time field that indicates a service section; and receiving at least one buffered frame from the AP within the sustain time in response to the poll frame. A method is provided for transmitting and receiving a frame executed by a station (STA) operating in a power sub mode in a wireless LAN system. The method includes transmitting a first poll frame requesting the transmission of a buffered frame to an access point AP, receiving an acknowledgement ACK frame in response to the first poll frame, and receiving at least one buffered frame from the AP.

8 Claims, 26 Drawing Sheets

Related U.S. Application Data

(60) Provisional application No. 61/561,246, filed on Nov. 17, 2011, provisional application No. 61/561,927, filed on Nov. 20, 2011.

(51) Int. Cl.
*H04W 84/12* (2009.01)
*H04L 12/825* (2013.01)
*H04W 76/28* (2018.01)

(52) U.S. Cl.
CPC .......... *H04L 47/266* (2013.01); *H04W 76/28* (2018.02); *H04W 84/12* (2013.01); *Y02D 70/00* (2018.01); *Y02D 70/142* (2018.01); *Y02D 70/168* (2018.01); *Y02D 70/21* (2018.01); *Y02D 70/22* (2018.01)

(56) References Cited

U.S. PATENT DOCUMENTS

| | | |
|---|---|---|
| 2004/0013128 A1 | 1/2004 | Moreton et al. |
| 2005/0018624 A1 | 1/2005 | Meier |
| 2005/0152324 A1 | 7/2005 | Benveniste |
| 2005/0201342 A1 | 9/2005 | Wilkinson |
| 2005/0254459 A1* | 11/2005 | Qian .................... H04L 1/1628 370/328 |
| 2006/0285526 A1 | 12/2006 | Jang |
| 2006/0291432 A1 | 12/2006 | Xhafa |
| 2007/0076675 A1 | 4/2007 | Chen |
| 2007/0201467 A1 | 8/2007 | Kakani |
| 2007/0218938 A1 | 9/2007 | Carter |
| 2007/0274280 A1 | 11/2007 | Haas |
| 2008/0225768 A1 | 9/2008 | Wentink |
| 2008/0298250 A1 | 12/2008 | Larsson |
| 2009/0196212 A1 | 8/2009 | Wentink |
| 2010/0165973 A1* | 7/2010 | Su .................... H04W 72/1215 370/345 |
| 2010/0214942 A1* | 8/2010 | Du ...................... H04L 43/0876 370/252 |
| 2011/0090855 A1* | 4/2011 | Kim .................... H04B 7/0452 370/329 |
| 2011/0158159 A1* | 6/2011 | Gong .................... H04L 1/1685 370/328 |
| 2011/0199952 A1 | 8/2011 | Seok |
| 2011/0299612 A1 | 12/2011 | Tan |
| 2013/0301523 A1 | 11/2013 | Asterjadhi |

FOREIGN PATENT DOCUMENTS

| | | |
|---|---|---|
| JP | 2002124964 A | 4/2002 |
| JP | 2004128949 A | 4/2004 |
| JP | 2005124159 A | 5/2005 |
| JP | 2005323357 A | 11/2005 |
| JP | 2005341557 A | 12/2005 |
| JP | 2010510724 A | 4/2010 |
| JP | 2011044928 A | 3/2011 |
| KR | 10-2008-0045015 A | 5/2008 |
| KR | 10-2009-0115479 A | 11/2009 |
| KR | 10-2010-0013505 A | 2/2010 |
| KR | 10-2011-0016374 A | 2/2011 |
| RU | 2411649 C2 | 2/2011 |
| RU | 2421924 C2 | 6/2011 |
| WO | 2008061202 A1 | 5/2008 |
| WO | 2011115408 A2 | 9/2011 |

\* cited by examiner

METHODS OF TRANSMITTING AND RECEIVING FRAME BY STATION OPERATING IN POWER SAVE MODE IN WIRELESS LAN SYSTEM AND APPARATUS FOR SUPPORTING SAME

This application is a continuation of U.S. patent application Ser. No. 14/356,068, filed May 2, 2014, now allowed, which is a National Stage Application of International Application No. PCT/KR2012/009796, filed Nov. 19, 2012, and claims priority to and the benefit of U.S. Provisional Application No. 61/561,246, filed on Nov. 17, 2011, and U.S. Provisional Application No. 61/561,927 Nov. 20, 2011 the disclosures of which are incorporated by reference herein in their entirety.

BACKGROUND OF THE INVENTION

Field of the Invention

The present invention relates to a wireless LAN system, and more specifically, a frame transmission/reception method by a station operating in a power save mode in a wireless LAN system and an apparatus supporting the same.

Related Art

With the growth of information communication technology, various wireless communication technologies have been recently developed. Among others, wireless LAN (Local Area Network) is a technology that allows for wireless access to the Internet at home or business or in a specific service area using a handheld terminal such as a personal digital assistant (PDA), a laptop computer, a portable multimedia player (PMP), etc.

IEEE 802.11n is a technology standard that has been recently established in order to overcome the limit to communication speed that has been recognized as a weakness of wireless LAN. IEEE 802.11n aims to increase network speed and reliability and expand coverage of a wireless network. More specifically, the IEEE 802.11n system adopts MIMO (Multiple Inputs and Multiple Outputs) technology that uses multiple antennas at both a transmission unit and a reception unit thereof so as to optimize data speed and to minimize transmission errors while supporting a high throughput (HT) of data processing speed up to 540 Mbps.

In the wireless LAN system, a station (STA) supports a power save mode. The station may prevent unnecessary power consumption by entering into a doze state. In case there is traffic associated with data that intends to be sent to an STA that is operating in a doze state, an access point (AP) may notify this to the STA. The STA recognizes existence of traffic associated with data intended to be sent thereto and may request that the AP be sending it to the STA. The AP may transmit a frame in response to the STA's request.

Meanwhile, if the AP may transmit only one frame in response to the request from the STA that has entered into an awake state, it may be inefficient in view of traffic processing. Further, the STA shifts between the awake state and doze state more frequently, and thus efficiency may be deteriorated in terms of power saving operation. Accordingly, a need exists for a frame transmission and reception method that may enhance power save mode efficiency of an STA and good traffic processing.

SUMMARY OF THE INVENTION

An object of the present invention is to provide a frame transmission and reception method that is performed by a station (STA) operating in a power save mode in a wireless local area network system and an apparatus supporting the same.

In an aspect, a method of transmitting and receiving a frame, performed by a station (STA) operating in a power save mode in a wireless local area network system is provided. The method includes transmitting, to an access point (AP), a poll frame for requesting transmission of a buffered frame, wherein the poll frame includes a duration field indicating a service period and receiving, from the AP, at least one buffered frame during the service period in response to the poll frame.

The method may further include transmitting an acknowledgement (ACK) frame as a response to acknowledge an reception of the at least one buffered frame.

The method may further include transmitting the ACK frame before the service period is terminated.

The ACK frame may be transmitted corresponding to a last buffered frame among the at least one buffered frame.

The method may further include transmitting, to the AP, a pre-poll frame for requesting transmission of the buffered frame, receiving, from the AP, an acknowledgement (ACK) frame in response to the pre-poll frame, and entering into a doze state after receiving the ACK frame.

The pre-poll frame may include a polled service period interval field, and the polled service period interval field may include information related to a time when the STA transmits the poll frame.

The method may further include entering into an awake state at a time indicated by the polled service period interval field, and performing contention for channel access. The poll frame is transmitted when a channel access authority is obtained through the contention.

In another aspect, a wireless device for operating in a wireless local area network system is provided. The wireless device includes a transceiver transmitting and receiving a radio signal, and a processor operatively coupled with the transceiver and configured to transmit, to an access point (AP), a poll frame for requesting transmission of a buffered frame, wherein the poll frame includes a duration field indicating a service period, and receive from the AP at least one buffered frame during the service period in response to the poll frame.

In still another aspect, a method of transmitting and receiving a frame, performed by a station (STA) operating in a power save mode in a wireless local area network system is provided. The method include transmitting, to an access point (AP), a first poll frame for requesting transmission of a buffered frame, receiving an acknowledgement (ACK) frame in response to the first poll frame, and receiving at least one buffered frame from the AP.

The ACK frame may include polled service period information related to a time when the AP starts transmission of the at least one buffered frame.

if the polled service period information indicates that an immediately buffered frame is to be transmitted, the at least one buffered frame may be received an SIFS (Short Inter Frame Space) after receiving the ACK frame, and the method may further include entering into a doze state after receiving the at least one buffered frame.

If the polled service period information indicates a specific time when the buffered frame is to be transmitted, the method may further include entering into a doze state after receiving the ACK frame, entering into an awake state at a time indicated by the polled service period information, transmitting to the AP a second poll frame for requesting transmission of the at least one buffered frame, and receiving the at least one buffered frame in response to the second poll frame.

The method may further include entering into a doze state after receiving the at least one buffered frame.

The second poll frame may include a duration field. The duration field may indicate a service period. The at least one or more buffered frame may be transmitted during the service period.

By a frame transmission and reception method according to an embodiment of the present invention, an STA may receive a buffered frame from an AP during a polled service period over multiple times and may enter into a doze state between polled service periods and operate, so that power consumption can be prevented. Further, the STA may receive at least one or more buffered frames during one polled service period, thus enabling efficient data transmission and reception. In addition, the AP may transmit a buffered frame during a service period even without RTS/CTS exchange in order to transmit a buffered frame, thus enhancing frame transmission and reception efficiency.

By a frame transmission and reception method according to an embodiment of the present invention, an STA may control a polled service period according to a transmission state of an AP's buffered frame. This may prevent the phenomenon that as a polled service period initiated by an SP-poll frame is unnecessarily maintained, even when transmission of a frame transmitted from the AP is not actually needed, a channel keeps being unnecessarily occupied since the STA holds channel access authority. Further, other STAs located in the service coverage of the AP and/or STA may also obtain a channel access authority by adjusting an NAV according to an actually adjusted service period. Accordingly, the overall throughput of the wireless LAN system may be enhanced.

DESCRIPTION OF EXEMPLARY EMBODIMENTS

Figure 1:
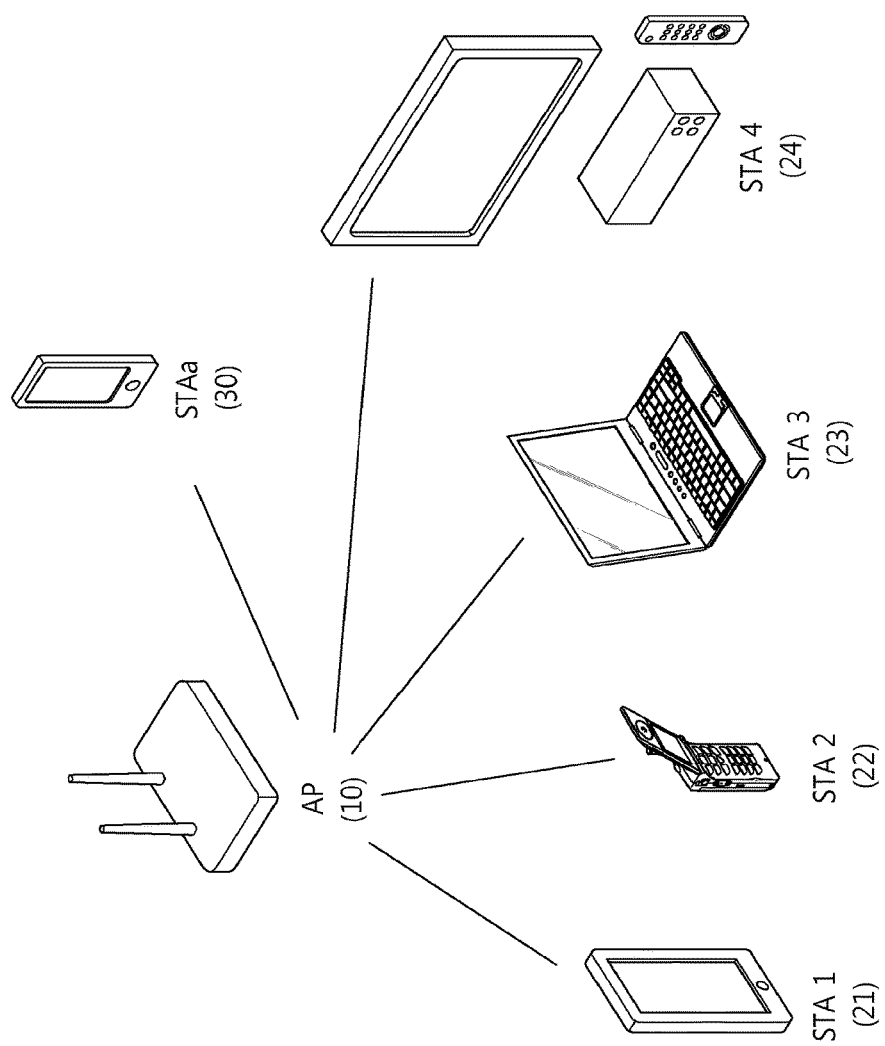
FIG. 1 is a view illustrating the configuration of a general wireless LAN (Local Area Network) system to which an embodiment of the present invention may apply.

FIG. 1 is a view illustrating the configuration of a general wireless LAN (Local Area Network) system to which an embodiment of the present invention may apply.

Referring to FIG. 1, the wireless LAN system includes one or more basic service sets (BSSs). A BSS is a set of stations (STAs) that may be successfully synchronized with each other and may communicate with each other, and is not a concept indicating a specific area.

An infrastructure BSS includes one or more non-AP stations (non-AP STA1(21), non-AP STA2(22), non-AP STA3(23), non-AP STA4(24), and non-AP STAa (30)), an AP (Access Point) 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional medium that includes a medium access control (MAC) that follows the IEEE (Institute of Electrical and Electronics Engineers) 802.11 standards and a physical layer interface of a radio medium and in broader concept includes an AP and a non-AP station.

The non-AP STA is an STA, but not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional medium that provides access to a DS via a radio medium for an STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the wireless LAN system according to IEEE 802.11, the basic access mechanism of MAC (Medium Access Control) is the CSMA/CS (Carrier Sense Multiple Access with Collision Avoidance) mechanism. The CSMA/CS mechanism is also referred to as distributed coordination function (DCF) of IEEE 802.11 MAC, and basically, it adopts a "listen before talk" access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the wireless LAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers an HCF (Hybrid Coordination Function) that is based on a PCF (Point Coordination Function) that periodically performs polling so that all receiving APs and/or STAs may receive data packets in polling-based synchronized access scheme with the DCF. The HCF has HCCA (HCF Controlled Channel Access) that uses contention free-based channel access scheme using a polling mechanism and EDCA (Enhanced Distributed Channel Access) that has a contention-based access scheme for providing data packets to multiple users. The HCF includes a medium access mechanism for enhancing QoS (Quality of Service) of wireless LAN and may transmit QoS data in both a contention period (CP) and contention free period (CFP).

The wireless communication system cannot be immediately aware of the existence of a network due to the characteristics of the radio medium when an STA powers on and starts operating. Accordingly, in order to access a network, an STA, whatever type it is, should go through a network discovery process. When discovering a network through the network discovery process, the STA selects a network to subscribe to through a network selection process. Thereafter, the STA subscribes to the selected network and performs data exchange at a transmission end/reception end.

In the wireless LAN system, the network discovery process is implemented as a scanning procedure. The scanning procedure is separated into passive scanning and active scanning. The passive scanning is achieved based on a beacon frame that is periodically broadcast by an AP. In general, an AP in the wireless LAN system broadcasts a beacon frame at a specific interval (for example, 100 msec). The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. When receiving the probe request frame, an AP waits for a random time so as to prevent frame collision, and then includes network information in a probe response frame, then transmits the probe response frame to the STA. The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in wireless LAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As wireless LAN spreads and more diversified applications using wireless LAN show up, a need for a new wireless LAN system arises for supporting a higher throughput than the data processing speed supported by IEEE 802.11n. The wireless LAN system supporting very high throughput (VHT) is a subsequent version of the IEEE 802.11n wireless LAN system, which is a new one recently suggested to support a throughput more than 500 Mbps for a single user and data processing speed more than 1 Gpbs for multiple users in an MAC service access point (SAP).

Advancing further than the existing wireless LAN system supporting 20 MHz or 40 MHz, the VHT wireless LAN system intends to support 80 MHz, contiguous 160 MHz, non-contiguous 160 MHz band transmission and/or more bandwidth transmission. Further, the VHT wireless LAN system supports 250QAM that is more than a maximum of 64QAM (Quadrature Amplitude Modulation) of the existing wireless LAN system.

Since the VHT wireless LAN system supports an MU-MIMO (Multi User-Multiple Input Multiple Output) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the wireless LAN system shown in the figure, the AP 10 may simultaneously transmit data to an STA group including at least one or more STAs among a plurality of STAs 21, 22, 23, 24, and 30 associated with the AP 10. In FIG. 1, by way of example, the AP conducts MU-MIMO transmission to the STAs. However, in a wireless LAN system supporting TDLS (Tunneled Direct Link Setup) or DLS (Direct Link Setup) or mesh network, an STA to transmit data may send a PPDU to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the wireless LAN system and transmitted, or a frame as a data field included in the PPDU. That is, the PPDU for SU (single user)-MIMO and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

In the wireless LAN system, an identifier may be assigned to the transmission target STA group in order to support MU-MIMO transmission, and this identifier is denoted group ID. The AP sends a group ID management frame including group definition information for allocating group IDs to the STAs supporting MU-MIMO transmission and accordingly the group IDs are assigned to the STAs before PPDU transmission. One STA may be assigned a plurality of group IDs.

Table 1 below represents information elements included in the group ID management frame.

TABLE 1

| order | information |
|---|---|
| 1 | category |
| 2 | VHT action |
| 3 | Membership status |
| 4 | Spatial stream position |

The category field and VHT action field are configured so that the frame corresponds to a management frame and to be able to identify being a group ID management frame used in a next-generation wireless LAN system supporting MU-MIMO.

As in Table 1, the group definition information includes membership status information indicating whether to belong to a specific group ID, and in case of belonging to the group ID, information indicating the number of position to which the spatial stream set of the STA corresponds in all the spatial streams according to MU-MIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, an STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Meanwhile, TV WS (White Space) draws attention as a newly available frequency band in the wireless LAN system. TV WS refers to an unused frequency band that is left as the analog TV broadcast is digitalized in the U.S. For example, TV WS includes a 54 to 598 MHz band. However, this is merely an example, and TV WS may be a permitted band that may be first used by a licensed user. The licensed user means a user that is permitted for use of a permitted band, and may also be referred to as a licensed device, primary user, or incumbent user.

The AP and/or STA operating in the TV WS should offer a protection function as to a licensed user, and this is because a licensed user has priority as to use of a TV WS band. For instance, in case a licensed user such as a microphone is already using a specific WS channel that is a frequency band split per protocol to have a certain bandwidth in the TV WS band, the AP and/or STA cannot use the frequency band corresponding to the WS channel in order to protect the licensed user. Further, the AP and/or STA should stop use of the frequency band if the licensed user happens to use the frequency band that is being used for transmission and/or reception of a current frame.

Accordingly, the AP and/or STA should first grasp whether a specific frequency band in the TV WS band is available, in other words, whether there is a licensed user in the frequency band. Grasping whether there is a licensed user in the specific frequency band is denoted spectrum sensing. As a spectrum sensing mechanism, an energy detection scheme or signature detection scheme may be utilized. If the strength of a received signal is higher than a predetermined value, it is determined that it is being used by a licensed user, or if a DTV preamble is detected, it may be determined to be being used by a licensed user.

Figure 2:
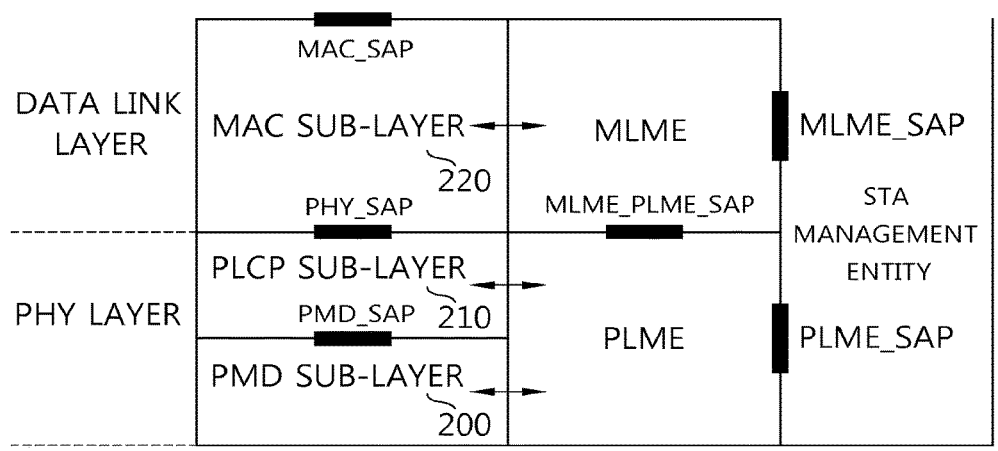
FIG. 2 is a view illustrating a physical layer architecture of a wireless LAN system supported by IEEE 802.11.

FIG. 2 is a view illustrating a physical layer architecture of a wireless LAN system supported by IEEE 802.11.

The IEEE 802.11 physical (PHY) architecture includes a PLME (PHY Layer Management Entity), a PLCP (Physical Layer Convergence Procedure) sublayer 210, and a PMD (Physical Medium Dependent) sublayer 200. The PLME provides a function of managing the physical layer in cooperation with the MLME (MAC Layer Management Entity). The PLCP sublayer 210 delivers an MPDU (MAC Protocol Data Unit) received from the MAC sublayer 220 to the PMD sublayer in response to an instruction of the MAC layer between the MAC sublayer 220 and the PMD sublayer 200 or delivers a frame coming from the PMD sublayer 200 to the MAC sublayer 220. The PMD sublayer 200 is a PLCP lower layer and enables transmission and reception of a physical layer entity between two stations through a radio medium. The MPDU delivered by the MAC sublayer 220 is denoted a PSDU (Physical Service Data Unit) in the PLCP sublayer 210. The MPDU is similar to the PSDU, but in case an A-MPDU (aggregated MPDU) obtained by aggregating a plurality of MPDUs is delivered, each MPDU may be different from each PSDU.

The PLCP sublayer 210 adds an additional field including information needed by a physical layer transceiver while delivering a PSDU from the MAC sublayer 220 to the PMD sublayer 200. At the time, the added field may include a PLCP preamble to the PSDU, a PLCP header, or tail bits necessary for turning a convolution encoder back into the zero state. The PLCP sublayer 210 receives from the MAC sublayer a TXVECTOR parameter including control information necessary to generate and transmit a PPDU and control information necessary for the STA to receive and analyze a PPDU. The PLCP sublayer 210 uses information included in the TXVECTOR parameter in generating a PPDU including the PSDU.

The PLCP preamble plays a role to let the receiver prepare for a synchronization function and antenna diversity before the PSDU is transmitted. The data field may include padding bits to the PSDU, a service field including a bit sequence for initializing a scrambler, and a coded sequence where the tail bits-added bit sequence is encoded. At the time, as an encoding scheme, depending on the encoding scheme supported by the STA receiving the PPDU, BCC (Binary Convolution Coding) encoding or LDPC (Low Density Parity Check) encoding may be selected. The PLCP header includes a field including information on the PPDU (PLCP Protocol Data Unit) to be transmitted, and this will be described in further detail below with reference to FIGS. 3 and 4.

Figure 3:
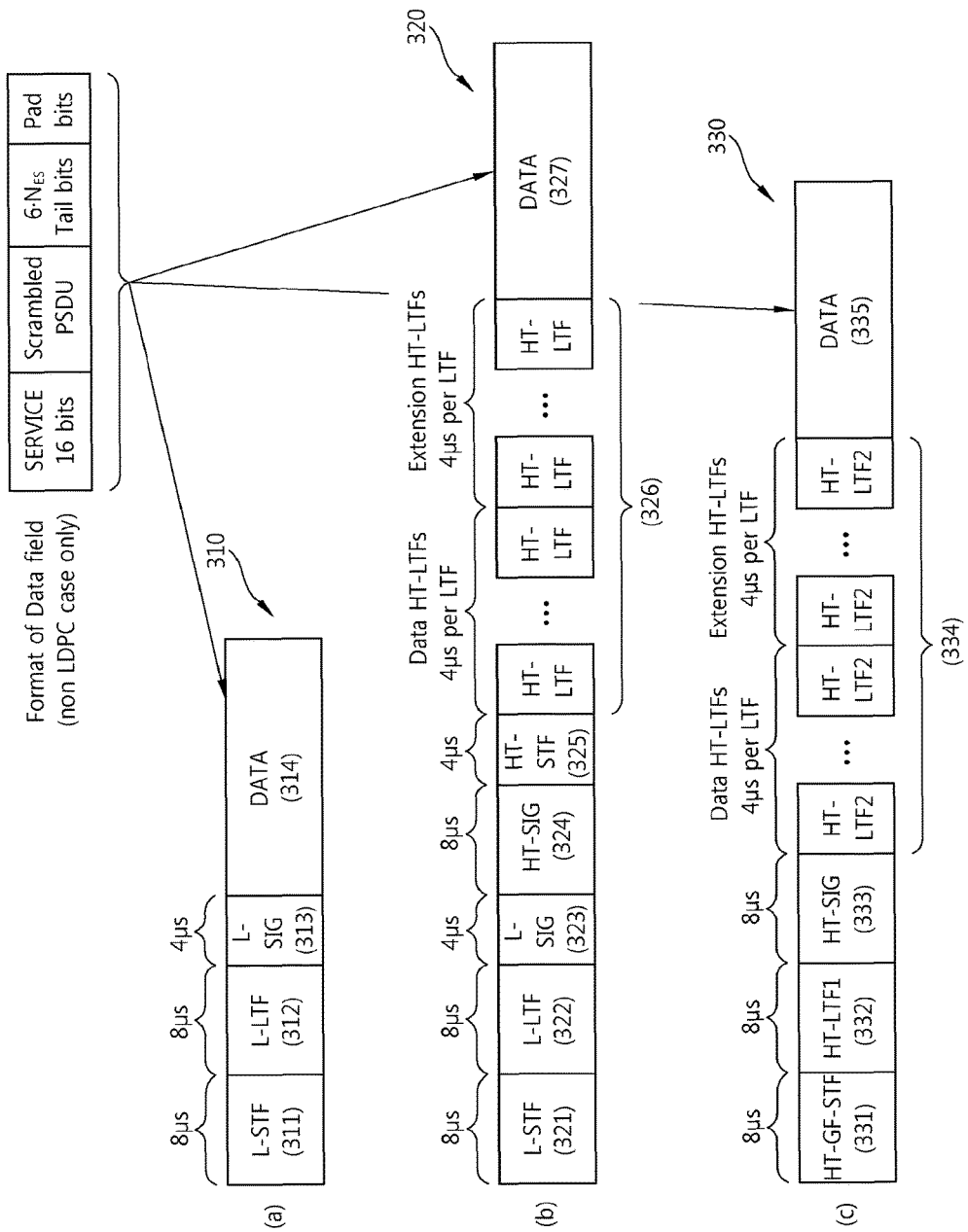
FIGS. 3 and 4 are block diagrams illustrating the format of a PPDU used in a wireless LAN system to which an embodiment of the present invention may apply.
Figure 4:
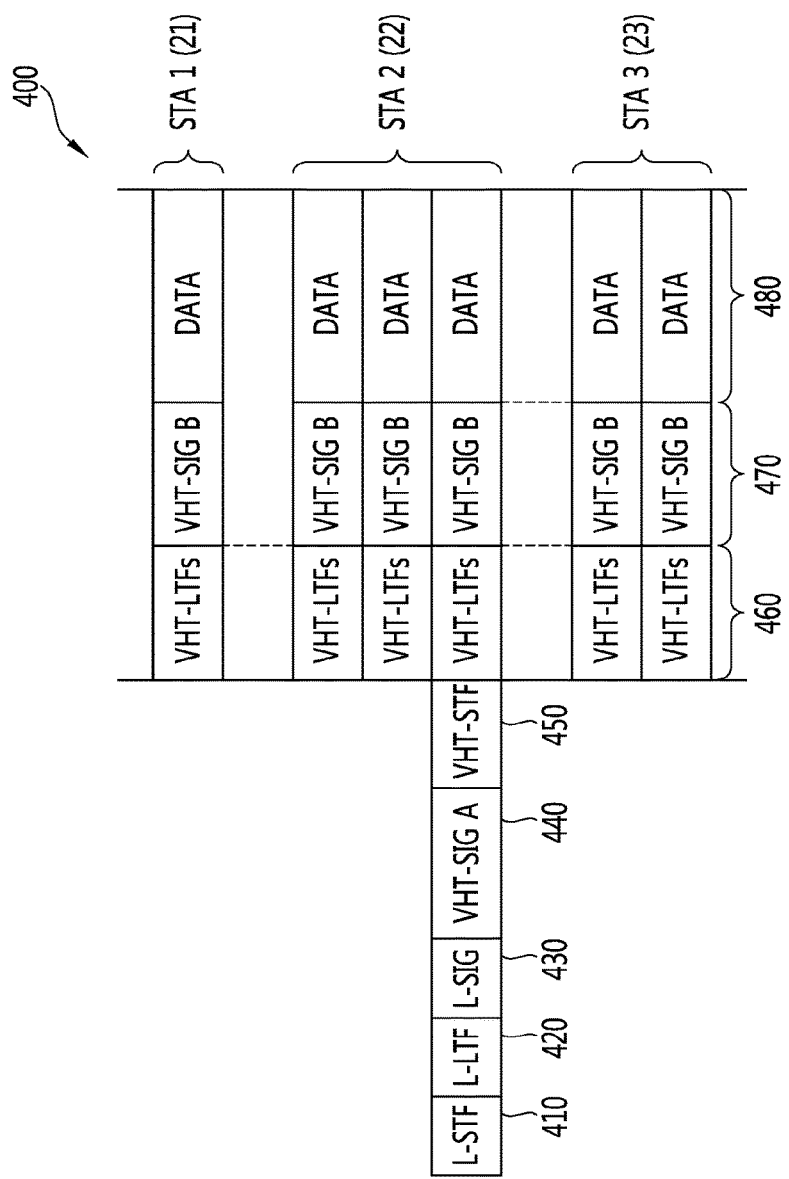

The PLCP sublayer 210 adds the above-described fields to the PSDU to thereby generate a PPDU (PLCP Protocol Data Unit) and transmits the PPDU to a receiving station via the PMD sublayer, and the receiving STA receives the PPDU and obtains the information necessary for restoring data from the PLCP preamble and PLCP header and restores data. The PLCP sublayer of the receiving station delivers to the MAC sublayer the RXVECTOR parameter including the control information contained in the PLCP header and the PLCP preamble and may analyze the PPDU and obtain data in the receiving state FIGS. 3 and 4 are block diagrams illustrating the format of a PPDU used in a wireless LAN system to which an embodiment of the present invention may apply. Hereinafter, the STA operating in a legacy wireless LAN system based on IEEE 802.11a/b/g, existing wireless LAN standards prior to IEEE 802.11n is referred to a legacy STA (L-STA). Further, the STA that may support HT in an HT wireless LAN system based on IEEE 802.11n is referred to as an HT-STA.

Subfigure (a) of FIG. 3 illustrates the format of a legacy PPDU (L-PPDU) used in IEEE 802.11a/b/g that are existing wireless LAN system standards before IEEE 802.11n. Accordingly, in the HT wireless LAN system to which the IEEE 802.11n standard applies, the legacy-STA (L-STA) may transmit and receive an L-PPDU having the same format.

The L-PPDU 310 includes an L-STF 311, an L-LTF 312, an L-SIG field 313, and a data field 314.

The L-STF 311 is used for frame timing acquisition, AGC (Automatic Gain Control) convergence, and coarse frequency acquisition.

The L-LTF 312 is used for frequency offset and channel estimation.

The L-SIG field 313 includes control information for demodulating and decoding the data field 314.

In the L-PPDU, the L-STF 311, the L-LTF 312, the L-SIG field 313, and the data field 314 may be transmitted in the order thereof.

Subfigure (b) of FIG. 3 is a block diagram illustrating an HT-mixed PPDU format that enables an L-STA and an HT-STA to co-exist. The HT-mixed PPDU 320 includes an L-STF 321, an L-LTF 322, an L-SIG 3 field 23, an HT-SIG field 324, an HT-STF 325, and a plurality of HT-LTFs 326, and a data field 327.

The L-STF 321, L-LTF 322, and L-SIG field 323 are the same as those denoted by reference numerals 311, 312, and 313, respectively. Accordingly, the L-STA, even when receiving the HT-mixed PPDU 320, may analyze the data field through the L-STF 321, L-LTF 322, and L-SIG 323. However, the L-SIG 323 may further include information for channel estimation that is to be conducted for the HT-STA to receive the HT-mixed PPDU 320 and to decipher the L-SIG 323, HT-SIG 324, and HT-STF 325.

The HT-STA may be aware that the HT-mixed PPDU 320 is a PPDU for itself through the HT-SIG 324 coming after the L-SIG 323, and based on this, may demodulate and decode the data field 327.

The HT-STF 325 may be used for frame timing synchronization or AGC convergence for an HT-STA.

The HT-LTF 326 may be used for channel estimation to demodulate the data field 327. Since IEEE 802.11n supports SU-MIMO, there may be a plurality of HT-LTFs 326 for each data field transmitted in a plurality of spatial streams.

The HT-LTF 326 may consist of a data HT-LTF used for channel estimation for a spatial stream and an extension HT-LTF additionally used for full channel sounding. Accordingly, the number of the plurality of HT-LTFs 326 may be equal to or more than the number of spatial streams transmitted.

In the HT-mixed PPDU 320, the L-STF 321, L-LTF 322, and the L-SIG field 323 are first transmitted so that the L-STA may also receive it to thereby obtain data. Thereafter, the HT-SIG field 324 is transmitted for demodulating and decoding data transmitted for the HT-STA.

The HT-SIG field 324 and its precedents are transmitted without beamforming, so that the L-STA and the HT-STA may receive the PPDU to thereby obtain data, and the HT-STF 325, HT-LTF 326 and the data field 327 transmitted thereafter are subjected to radio signal transmission through precoding. Here, the HT-STF 325 is transmitted and then the plurality of HT-LTFs 326 and the data field 327 are transmitted so that a power variation by precoding may be taken into account by the STA conducting reception through precoding.

Although in the HT wireless LAN system, the HT-STA using 20 MHz uses 52 data subcarriers per OFDM symbol, the L-STA using the same frequency, 20 MHz, still makes use of 48 subcarriers per OFDM symbol. In order for backward compatibility with the existing systems, the HT-SIG field 324 in the HT-mixed PPDU 320 is decoded using the L-LTF 322, so that the HT-SIG field 324 is constituted of 48×2 data subcarriers. Thereafter, the HT-STF 325 and the HT-LTF 326 consists of 52 data subcarriers per OFDM symbol. As a result, the HT-SIG field 324 is supported with ½, BPSK (Binary Phase Shift Keying), each HT-SIG field 324 consists of 24 bits, and is thus transmitted with a total of 48 bits. In other words, channel estimation for the L-SIG field 323 and the HT-SIG field 324 utilizes the L-LTF 322, and the bit stream constituting the L-LTF 322 is represented as in Equation 1 below. The L-LTF 322 consists of 48 data subcarriers except a DC subcarrier per symbol.

$$L_{-26,26} = \{1,1,-1,-1,1,1,-1,1,-1,1,1,1,1,1,1,-1,-1,1,\\1,-1,1,-1,1,1,1,1,0,1,-1,-1,1,1,-1,1,-1,1,-\\1,-1,-1,-1,1,1,-1,-1,1,-1,1,-1,1,1,1,1\} \quad [\text{Equation 1}]$$

Subfigure (c) of FIG. 3 is a block diagram illustrating an HT-greenfield PPDU 330 format that may be used only by an HT-STA. The HT-GF PPDU 330 includes an HT-GF-STF 331, an HT-LTF1 332, an HT-SIG 333, a plurality of HT-LTF2's 334, and a data field 335.

The HT-GF-STF 331 is used for frame timing acquisition and AGC.

The HT-LTF1 332 is used for channel estimation.

The HT-SIG 333 is used for demodulating and decoding the data field 335.

The HT-LTF2 334 is used for channel estimation for demodulating the data field 335. Likewise, the HT-STA uses SU-MIMO and thus requires channel estimation for each data field transmitted I a plurality of spatial streams. Accordingly, a plurality of HT-LTFs 326 may be configured.

The plurality of HT-LTF2's 334 may consist of a plurality of extension HT-LTFs and a plurality of data HT-LTFs like the HT-LTFs 326 of the HT-mixed PPDU 320.

Each of the data fields 314, 327, and 335 may include a service field, a scrambled PSDU, a tail bit and a padding bit. The service field may be used for initializing a scrambler. The service field may be configured as 16 bits. In such case, seven bits may be configured for initializing a scrambler. The tail field may be configured as a bit sequence necessary for turning a convolution encoder back into a zero state. The tail field may be assigned a bit size that is proportional with the number of BCC (Binary Convolutional Code) encoders used for encoding data to be transmitted. More specifically, it may be configured to have six bits per BCC count.

FIG. 4 is a view illustrating an example of a PPDU format used in a wireless LAN system supporting VHT.

Referring to FIG. 4, the PPDU 400 may include an L-STF 410, an L-LTF 420, an L-SIG field 430, a VHT-SIGA field 440, a VHT-STF 450, a VHT-LTF 460, a VHT-SIGB field 470, and a data field 480.

The PLCP sublayer configuring the PHY adds necessary information to the PSDU delivered from the MAC layer to generate the data field 480, adds to it the L-STF 410, the L-LTF 420, the L-SIG field 430, the VHT-SIGA field 440, the VHT-STF 450, the VHT-LTF 460, and the VHT-SIGB field 470 or other fields to thereby generate the PPDU 400, and transmits it to one or more STAs through the PMD sublayer constituting the PHY. The control information necessary for the PLCP sublayer to generate the PPDU and the control information that is included in the PPDU and transmitted to be used for the receiving STA to interpret the PPDU are provided from the TXVECTOR parameter delivered from the MAC layer.

The L-STF 410 is used for frame timing acquisition, AGC (Automatic Gain Control) convergence, and coarse frequency acquisition.

The L-LTF 420 is used for channel estimation to demodulate the L-SIG field 430 and the VHT-SIGA field 440.

The L-SIG field 430 is used for the L-STA to receive the PPDU 400 and interpret the PPDU 400 to thereby obtain data. The L-SIG field 430 includes a rate subfield, a length subfield, a parity bit and a tail field. The rate subfield is set with a value indicating a bit rate for data to be currently transmitted.

The length subfield is set as a value indicating the octet length of the PSDU by which the MAC layer sends a request for transmission to the PHY layer. At the time, a parameter related to the information on the octet length of the PSDU, L-LENGTH parameter, is determined based on a transmission time-related parameter, TXTIME parameter. TXTIME indicates a transmission time determined for transmission of the PPDU including the PSDU by the PHY layer, corresponding to the transmission time requested by the MAC layer for transmission of the PSDU (physical service data unit). Accordingly, the L-LENGTH parameter is a time-related parameter, and thus, the length subfield included in the L-SIG field 430 ends up containing transmission time-related information.

The VHT-SIGA field 440 includes control information (or signal information) necessary for the STAs receiving the PPDU to interpret the PPDU 400. The VHT-SIGA field 440 is transmitted in two OFDM symbols. Accordingly, the VHT-SIGA field 440 may be split into a VHT-SIGA1 field and a VHT-SIGA2 field. The VHT-SIGA1 field includes information on the channel bandwidth used for PPDU transmission, identification information related to whether STBC (Space Time Block Coding) is to be used, information indicating one of the SU or MU-MIMO scheme in which the PPDU is transmitted, information indicating a transmission target STA group including a plurality of STAs MU-MIMO paired with the AP in case the transmission scheme is MU-MIMO, and information on a spatial stream assigned to each STA included in the transmission target STA group. The VHT-SIGA2 field includes short guard interval (GI)-related information.

The information indicating the MIMO transmission scheme and the information indicating the transmission target STA group may be implemented as one piece of MIMO indication information, and as an example, may be embodied as a group ID. The group ID may be set as a value having a specific range, and in the range, a predetermined value indicates the SU-MIMO transmission scheme, and the other values may be used as an identifier for the transmission target STA group in case the PPDU 400 is transmitted in the MU-MIMO transmission scheme.

If the group ID indicates that the PPDU 400 is transmitted through the SU-MIMO transmission scheme, the VHT-SIGA2 field includes coding indication information indicating whether the coding scheme applied to the data field is BCC (Binary Convolution Coding) or LDPC (Low Density Parity Check) coding and MCS (modulation coding scheme) information on a channel between transmitter and receiver. Further, the VHT-SIGA2 field may include a partial AID including the AID of the transmission target STA of the PPDU and/or some bit sequences of the AID.

If the group ID indicates that the PPDU 400 is transmitted through the MU-MIMO transmission scheme, the VHT-SIGA field 440 includes coding indicating information indicating whether the coding scheme applied to the data field intended to be sent to the receiving STAs MU-MIMO paired is BCC or LDPC coding. In such case, the MCS (modulation coding scheme) information on each receiving STA may be included in the VHT-SIGB field 470.

The VHT-STF 450 is used for enhancing the ACG estimation capabilities in MIMO transmission.

The VHT-LTF 460 is used for an STA to estimate an MIMO channel. Since the next-generation wireless LAN system supports MU-MIMO, as many VHT-LTFs 460 as the number of spatial streams where the PPDU 400 is transmitted may be configured. Additionally, full channel sounding is supported, and in case this is conducted, the number of VHT LTFs may increase.

The VHT-SIGB field 470 includes dedicated control information necessary for a plurality of MIMO paired STAs to receive the PPDU 400 to obtain data. Accordingly, only when the control information included in the PPDU 400 indicates that the currently received PPDU 400 is MU-MIMO transmitted, the STA may be designed to decode the VHT-SIGB field 470. On the contrary, in case the control information included in the VHT-SIGA field 440 indicates that the currently received PPDU 400 is one for a single STA (including SU-MIMO), the STA may be designed not to decode the VHT-SIGB field 470.

The VHT-SIGB field 470 may contain information on the MCS (modulation and coding scheme) for each STA and information on rate matching. Further, it may contain information indicating the PSDU length included in the data field for each STA. The information indicating the length of the PSDU is information indicating the length of the bit sequence of the PSDU and may perform such information on a per-octet basis. Meanwhile, in case the PPDU is SU-transmitted, the information on the MCS is included in the VHT-SIGA field 440, so that it might not be included in the VHT-SIGB field 470. The size of the VHT-SIGB field 470 may vary depending on the type of the MIMO transmission (MU-MIMO or SU-MIMO) and channel bandwidth used for transmission of the PPDU.

The data field 480 includes data which intends to be sent to the STA. The data field 480 includes a service field for initializing a scrambler and PSDU (PLCP Service Data Unit) where an MPDU (MAC Protocol Data Unit) is delivered in the MAC layer, a tail field including a bit sequence necessary to turn the convolution encoder back into zero state, and padding bits for normalizing the length of the data field. In the case of MU transmission, the data field 480 transmitted to each STA may include a data unit whose transmission is intended, and the data unit may be an A-MPDU (aggregate MPDU).

In the wireless LAN system as shown in FIG. 1, in case the AP 10 attempts to send data to STA1 21, STA2 22, and STA3 23, a PPDU may be transmitted to the STA group including STA1 21, STA2 22, STA3 223, and STA4 24. In such case, as shown in FIG. 4, no spatial stream may be assigned to STA4 24, and a specific number of spatial streams are assigned to each of the STA1 21, STA2 22, and STA3 23, and data may be transmitted accordingly. In the example as illustrated in FIG. 4, one spatial stream may be assigned to STA1 21, three to STA2 22, and two to STA3 23.

Figure 5:
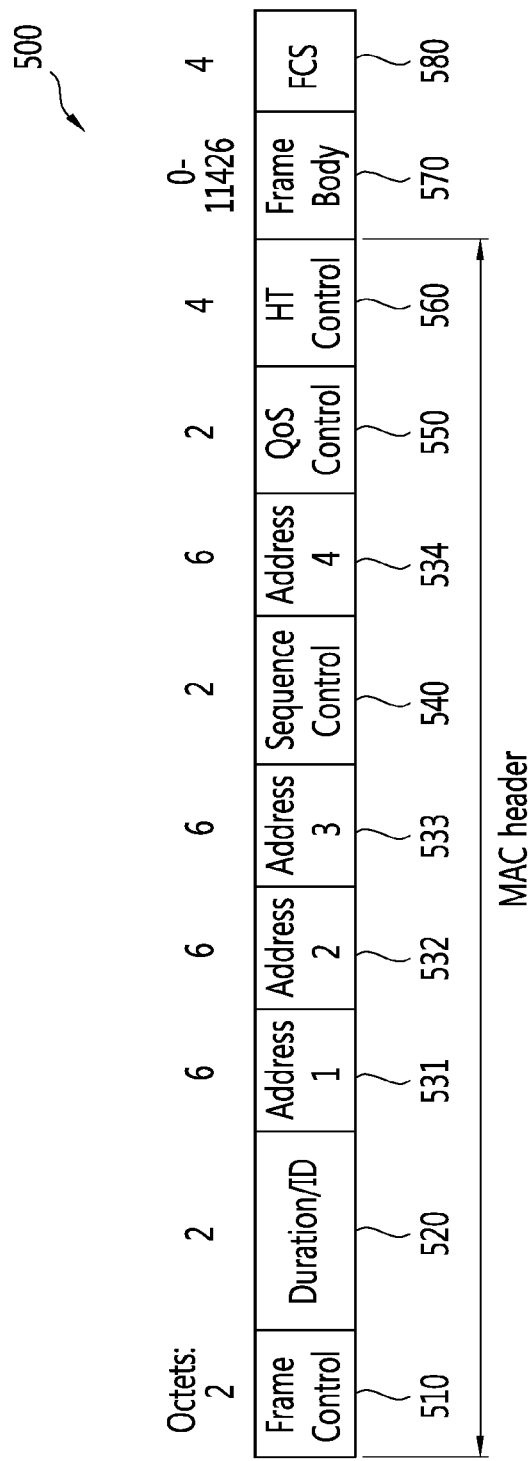
FIG. 5 is a block diagram illustrating the format of an MAC frame provided in a wireless LAN system.

FIG. 5 is a block diagram illustrating the format of an MAC frame provided in a wireless LAN system. The MAC frame may be an MPDU (in case of being delivered in PHY layer, PSDU) included in the data field of the above-described PPDU.

Referring to FIG. 5, the MAC frame 500 includes a frame control field 510, a duration/ID field 520, an address 1 field 531, an address 2 field 532, an address 3 field 533, a sequence control field 540, an address 4 field 534, a QoS control field 550, an HT control field 560, a frame body 570, and an FCS (Frame Check Sequence) field 580.

The frame control field 510 includes information on frame characteristics. The frame control field may contain protocol version information indicating the version of the wireless LAN standards supported by the frame 500 and information on the type and subtype for identifying the function of the frame.

The duration/ID field 520 may be implemented to have different values depending on the type and subtype of the MAC frame 500. In case the type and subtype of the MAC frame 500 are PS-poll frames for power saving operation, the duration/ID field 520 may be configured to include the AID of the STA that has sent the MAC frame 500. In other cases, the duration/ID field 520 may be configured to have a specific duration value depending on the type and subtype of the MAC frame 500. In case the MAC frame 500 is an MPDU included in the A-MPDU format, the duration/ID field 520 included in the MAC header of each MPDU may be implemented to have the same value.

The address 1 field 531 to the address 4 field 534 may be configured to implement specific fields among a BSSID field indicating a BSSID, an SA field indicating a source address (SA), a DA field indicating a destination address (DA), a TA (transmitting address) field indicating a transmitting STA address, and an RA (Receiving Address) field indicating a receiving STA address. Meanwhile, the address field embodied as a TA field may be set as a bandwidth signaled TA value, and in such case, the TA field may indicate that the frame contains additional information in the scrambling sequence. The bandwidth signaled TA may be represented in an MAC address of the STA transmitting the frame, but the individual/group bit included in the MAC address may be set as a predetermined value, e.g., 1.

The sequence control field 540 is configured to include a sequence number and a fragment number. The sequence number may indicate a sequence number assigned to the MAC frame 500. The fragment number may indicate the number of each fragment in the MAC frame 500.

The QoS control field 550 includes information related to QoS.

The HT control field 560 includes control information related to a high throughput (HT) transmission/reception scheme and/or very high throughput (VHT) transmission/ reception scheme. The implementation of the HT control field 560 is described in further detail below.

The frame body 570 may include data that a receiving STA and/or AP intends to send. The frame body 570 may include a control frame, a management frame, an action frame, and/or a data frame with a body component except the MAC header and FCS. In case the MAC frame 500 is a management frame and/or action frame, the information elements contained in the management frame and/or action frame may be implemented in the frame body 570.

The FCS field 580 includes a bit sequence for CRC.

Hereinafter, the above-described HT control field is described in greater detail with some drawings.

Figure 6:
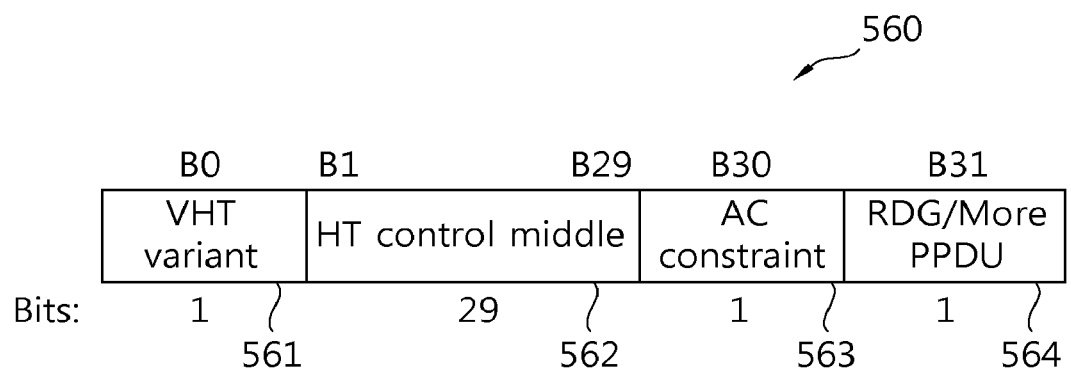
FIG. 6 is a block diagram illustrating the format of an HT control field.

FIG. 6 is a block diagram illustrating the format of an HT control field.

Referring to FIG. 6, the HT control field 560 includes a VHT variant field 561, an HT control middle field 562, an AC constraint field 563, and a RDG/More PPDU field 564.

The VHT variant field 561 indicates whether the HT control field 560 has an HT control field format for VHT or HT control field format for HT. As an example, the VHT variant field 561 may be embodied as a field having a one-bit length, and depending on the value, it may be indicated whether the HT control middle field 562 is realized to have a format for HT or format for VHT.

The HT control middle field 562 may be implemented to have a different format depending on the indication of the VHT variant field 561. The specific implementation of the HT control middle field 562 is described in further detail below.

The AC constraint field 563 indicates whether the mapped AC (Access Category) of an RD (Reverse Direction) data frame is restricted to a single AC.

The RDG/More PPDU field 564 may be interpreted in different ways depending on whether the field is transmitted by an RD initiator or RD responder. When transmitted by the RD initiator, if the RDG/More PPDU field is set as '1', it can be interpreted that there is an RDG and this may be defined by the duration/ID field. When sent by the RD responder, if the RDG/More PPDU field is set as '0,' it can be interpreted that the PPDU including the same indicates the last frame as transmitted by the RD responder. If the RDG/More PPDU field is set as 1, it can be construed that subsequent to the PPDU including the same, other PPDU is to be transmitted.

Figure 7:
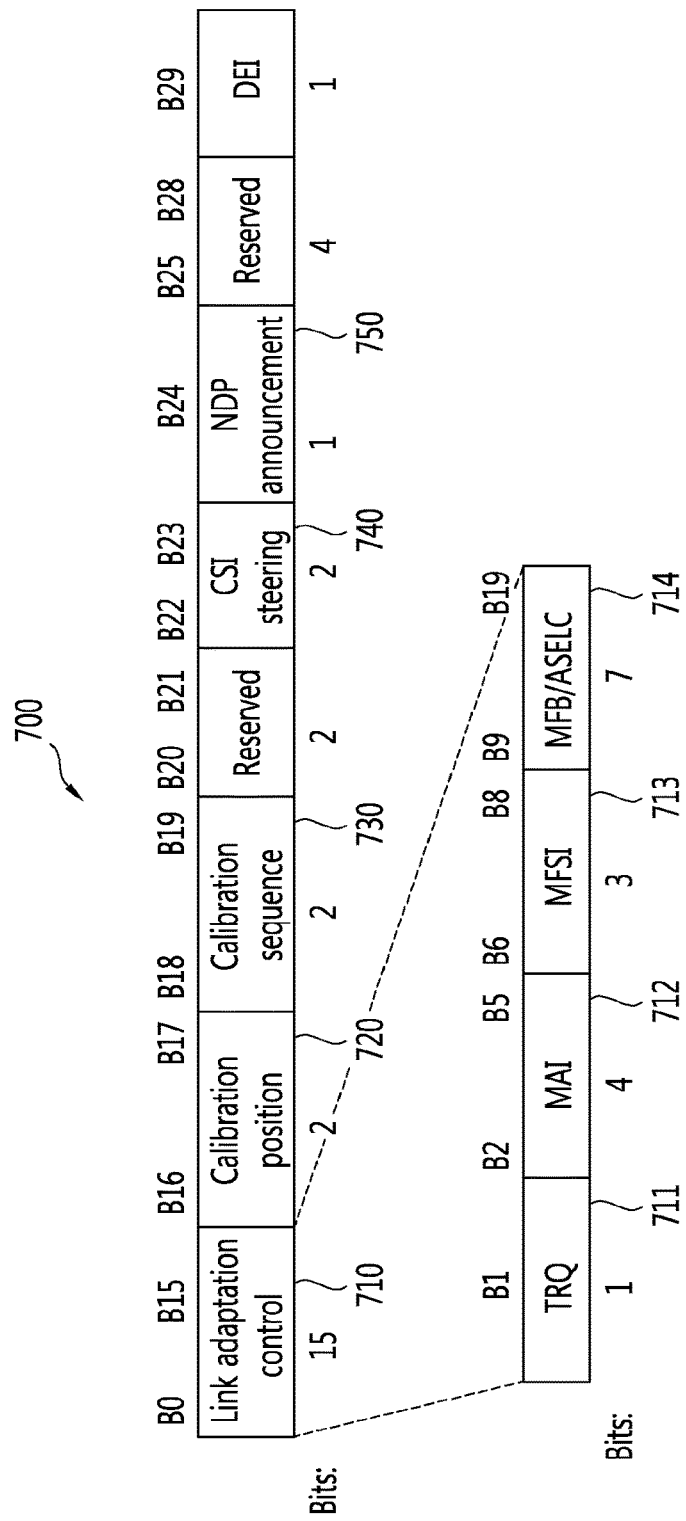
FIG. 7 is a block diagram illustrating the format of an HT variant middle field for HT.

FIG. 7 is a block diagram illustrating the format of an HT variant middle field for HT.

Referring to FIG. 7, the HT variant middle field 700 for HT includes a link adaptation control subfield 710, a calibration position subfield 720, a calibration sequence subfield 730, a CSI (Channel State Information)/steering subfield 740, and an NDP (Null Data Packet) announcement subfield 750.

The link adaptation control subfield 710 may include a TRQ (training request) subfield 711, an MAI (MCS request or ASEL (antenna selection) Indication) subfield 712, an MFSI (MCAS feedback sequence identifier) subfield 713 and an MFB/ASELC (MCS feedback and ASEL command/data) subfield 714.

The TRQ subfield 711 includes information for requesting that a sounding responder send a sounding frame. The MAI subfield 712 may contain indication information for requesting MCS feedback or information indicating that the MFB/ASELC subfield 714 contains antenna selection indication information. The MAI subfield 712 includes an MCS request (MRQ) indication bit and may contain an MSI (MRQ Sequence Identifier) subfield having a sequence number that enables identification of the MRQ. By setting the value of the subfield, whether MCS feedback is requested may be denoted. The MFSI subfield 713 may be set as a received value of the MSI included in the MFB information-related frame. The MFB/ASELC subfield 714 contains MFB information or antenna selection indication information.

The calibration position subfield 720 and the calibration sequence subfield 730 include the position of a calibration sounding exchange sequence and identification information of a calibration sequence.

The CSI/steering subfield 740 indicates information denoting a feedback type.

The NDP announcement subfield 750 may be set as NDP announcement indication information indicating that an NDP is to be sent subsequent to the PPDU currently transmitted. The NDP announcement subfield 750 may be configured to have a one-bit size, and when receiving a PPDU, the STA may verify whether the PPDU is an NDPA frame through the value of the NDP announcement subfield 750.

Figure 8:
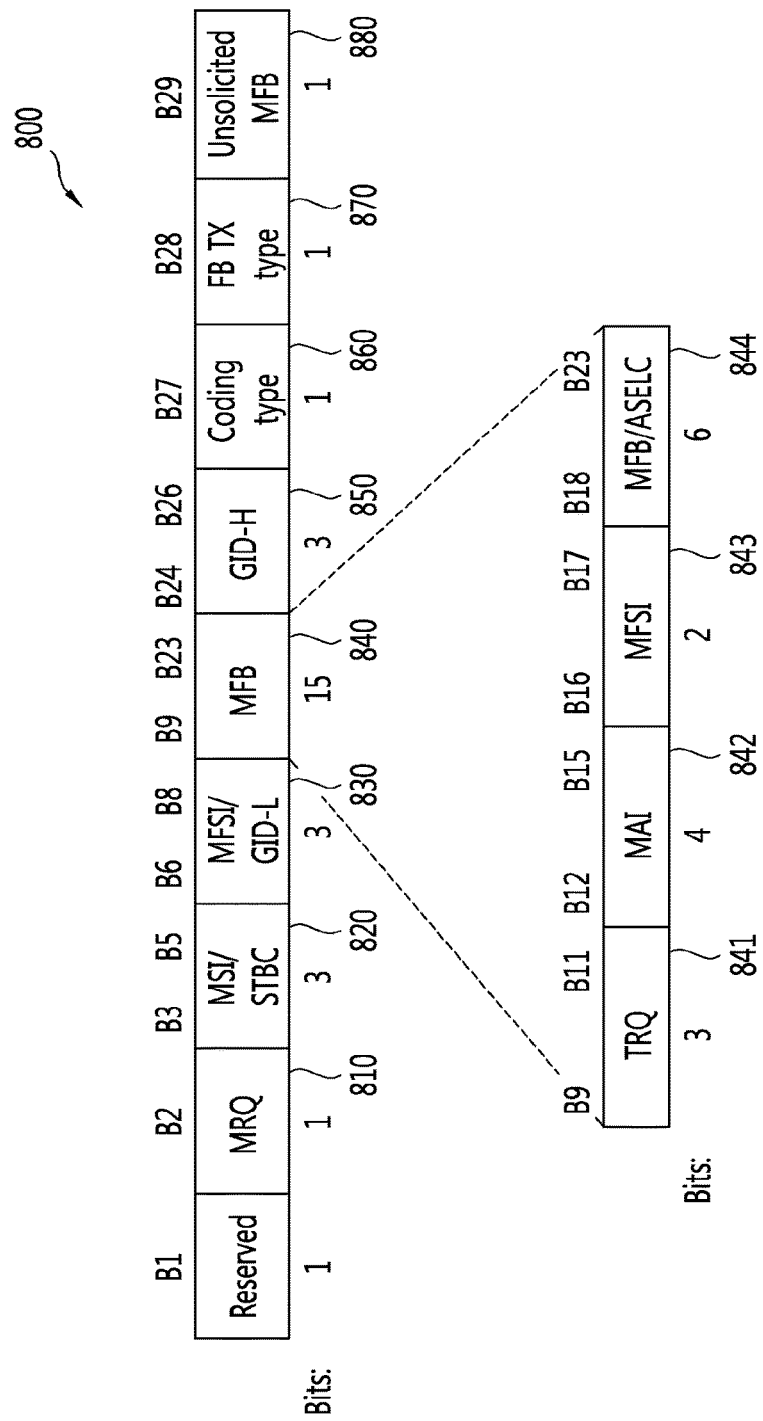
FIG. 8 is a block diagram illustrating the format of an HT variant middle field for VHT.

FIG. 8 is a block diagram illustrating the format of an HT variant middle field for VHT.

Referring to FIG. 8, the HT variant middle field 800 for VHT includes an MRQ subfield 810, an MSI subfield 820, an MFSI/GID-L subfield 830, an MFB subfield 840, an GID-H subfield 850, a coding type subfield 860, an FB Tx type subfield 870, and an unsolicited MFB subfield 880.

The MRQ subfield 810 indicates whether to request MCS feedback. If the MRQ subfield 810 is set as 1, it can be implemented that MCS feedback is requested.

The MSI subfield 820 includes, when the MRQ subfield 810 indicates requesting MCS feedback, a sequence number for identifying the specific request.

The unsolicited MFB subfield 880 may indicate whether the included MFB information responds to the MRQ. If the unsolicited MFB subfield 880 is set as 1, the included MFB information may be implemented to be a response to the MRQ. If the unsolicited MFB subfield 880 is set as 0, the included MFB information may be implemented to be not a response to the MRQ.

The MFSI/GID-L subfield 830 may be construed in different ways depending on the configuration of the unsolicited MFB subfield 880. If the unsolicited MFB subfield 880 indicates that the included MFB information is a response to the MRQ, it may include the reception value of the MSI contained in the MFB information-related frame. If the unsolicited MFB subfield 880 indicates that the included MFB information is not a response to the MRQ, it may contain lowest three bits constituting the group ID of the PPDU related to the unsolicited MFB information.

The MFB subfield 840 may include recommended MFB information. The MFB subfield 840 may include a VHT N_STS subfield 841, an MCS subfield 842, a BW subfield 843, and an SNR subfield 844. The VHT N_STS subfield 841 indicates the number of recommended spatial streams. The MCS subfield 842 indicates a recommended MCS (modulation coding scheme). The BW subfield 843 indicates bandwidth information related to the recommended MCS. The SNR subfield indicates an average SNR value over a spatial stream and a data subcarrier.

The GID-H subfield 850 may include highest three bits constituting a group ID of a PPDU related to the unsolicited MFB information if the unsolicited subfield 880 indicates that the MFB information is not a response to the MRQ and the MFB is estimated from a PPDU for MU transmission and reception. If the MFB is estimated from a PPDU for SU transmission and reception, the GID-H subfield 850 may include a bit sequence set as 1.

The coding type subfield 860, in case the unsolicited MFB subfield 880 indicates that the MFB information is not a response to the MRQ, may include coding information (BCC or LDPC) of the frame where the unsolicited MFB information has been estimated.

The FB Tx type subfield 870 may be configured to indicate the transmission type of the estimated PPDU. That is, it may indicate whether the estimated PPDU has been beamformed.

Whether the VHT variant field 561 is separated into the HT control field for VHT and HT control field for HT may be done based on the control information included in the HT control middle field 562.

Meanwhile, the next-generation wireless LAN system supports MU-MIMO (multi user multiple input multiple output) scheme in which a plurality of STAs simultaneously gain access to the channel in order to efficiently use the radio channel. According to the MU-MIMO transmission scheme, the AP may transmit packets to one or more MIMO-paired STAs at the same time.

Always sensing a channel for frame transmission and reception causes the STA to continue to consume power. The power consumption in the reception state makes little difference as compared with the power consumption in the transmission state, so that keeping the reception state causes the STA battery powered to consume relatively more power. Accordingly, when in the wireless LAN system an STA conducts channel sensing while continuously maintaining the reception waiting state, inefficient power consumption may arise without particularly increasing wireless LAN throughput, and thus, it is inappropriate in view of power management.

To compensate for such problems, the wireless LAN system supports a power management (PM) mode for an STA. The STA power management mode is separated into an active mode and a power save (PS) mode. The STA operates basically in the active mode. The STA operating in the active mode maintains an awake state. That is, the STA remains at a state of being able to perform normal operation such as frame transmission and reception or channel sensing.

When in normal operation, the STA shifts between the doze state and awake state. In the doze state, the STA operating with the minimum power and does not receive radio signals including data frames from the AP. Further, in the doze state, the STA does not conduct channel sensing.

As the STA operates as long as possible, power consumption decreases, so that the operation period of the STA is increased. However, since frame transmission and reception is impossible in the doze state, it cannot be left at the operation state unconditionally. In case there is a frame to be transmitted from the STA operating in the doze to the AP, the STA shifts to the awake state, thereby able to receive frames. However, in case the AP has a frame to be transmitted to the STA operating in the doze state, the STA cannot receive the frame nor is the STA able to be aware of the existence of the STA. Accordingly, the STA may require the operations of being aware of whether there is a frame to be sent to the STA, and if any, shifting to the awake state at a specific period so as to receive the frame. This is described below in connection with FIG. 9.

Figure 9:
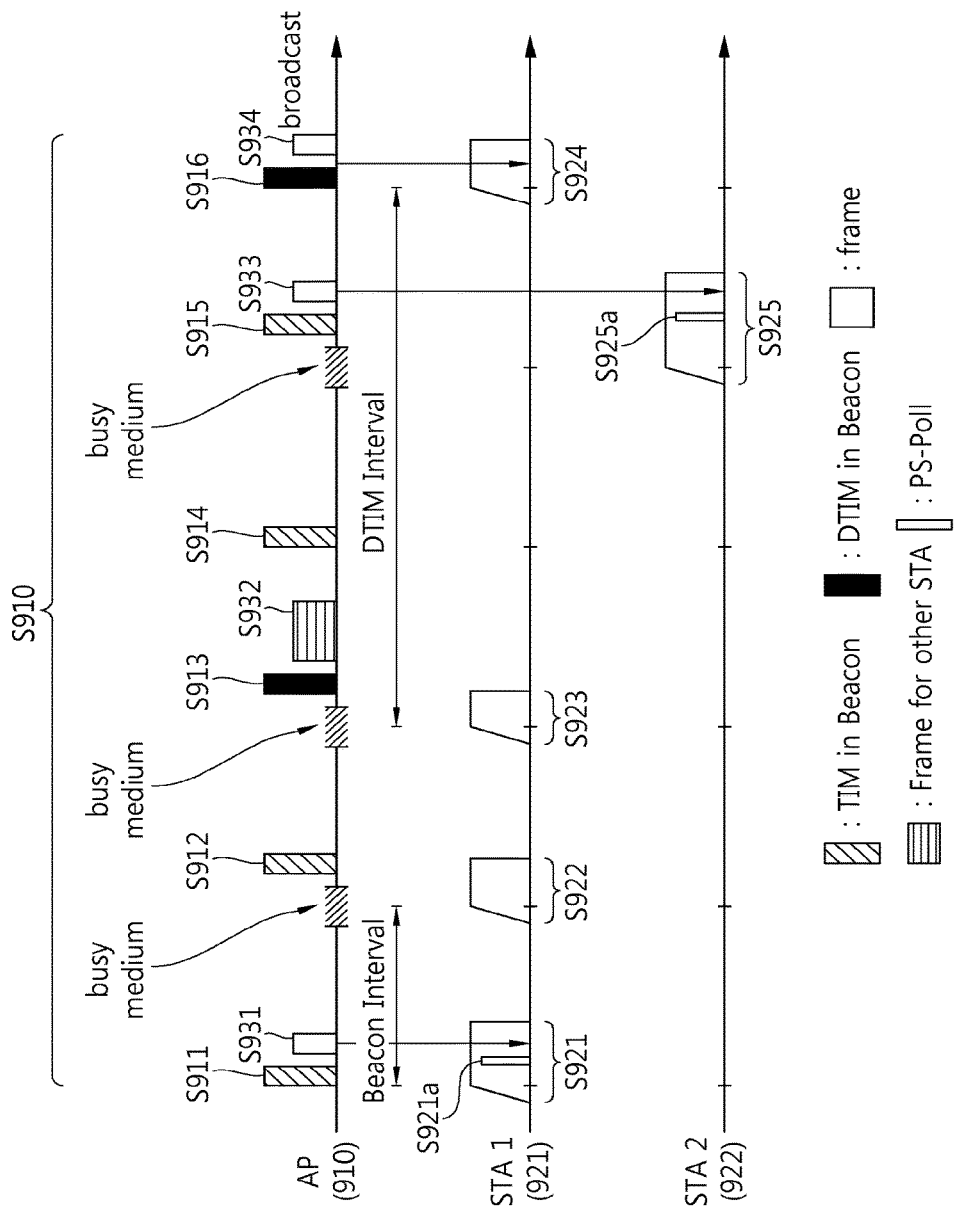
FIG. 9 is a view illustrating an example of power management operation.

FIG. 9 is a view illustrating an example of power management operation.

Referring to FIG. 9, the AP 910 sends a beacon frame to STAs in a BSS at a constant period (S910). The beacon frame includes a TIM (traffic indication map) information element. The TIM element includes information indicating that the AP 910 buffers a bufferable frame (or bufferable unit; BU) for the STAs associated with the AP 910 and that the frame is to be sent. The TIM element includes a TIM used to indicate a unicast frame and a DTIM (delivery traffic indication map) used to indicate a multicast or broadcast frame.

The AP 910 transmits a DTIM once every three beacon frames of transmission.

STA1 921 and STA2 922 are STAs operating in PS mode. STA1 921 and STA2 922 shift from the doze state to the awake state at every wakeup interval of a specific period so that the STAs may receive the TIM element transmitted from the AP 910.

A specific wakeup interval may be configured so that STA1 921 may shift to the awake state at every beacon interval to thus receive a TIM element. Accordingly, when the AP 910 first sends out a beacon frame (S911), STA1 921 switches to the awake state (S921). STA1 921 receives the beacon frame and obtains the TIM element. In case the obtained TIM element indicates that a bufferable frame to be sent to STA1 921 is being buffered, STA1 921 transmits a PS-poll frame to the AP 910 to request that the AP 910 send a frame (S921a). In response to the PS-poll frame, the AP 910 sends a frame to STA1 921 (S931). When completely receiving the frame, STA1 921 turns back to the doze state.

When the AP 910 sends out a second beacon frame, since the medium is occupied, for example, as if another device gains access to the medium, the AP 910 fails to send a beacon frame at exact beacon interval and may deferred transmission of the beacon frame (S912). In such case, STA1 921 turns its operation mode to the awake state according to the beacon interval, but cannot receive the deferred beacon frame, so that STA1 921 switches back to the doze state (S922).

When the AP 910 sends out a third beacon frame, the beacon frame may include a TIM element that is set as DTIM. However, since the medium is occupied, the AP 910's transmission of the beacon frame is deferred (S913). STA1 921 switches to the awake state in accordance with the beacon interval and may obtain the DTIM through the beacon frame transmitted by the AP 910. The DTIM obtained by STA1 921 indicates that there is no frame to be transmitted to STA1 921 and that there is a frame for other STA. Accordingly, STA1 921 shifts back to the doze state. The AP 910, after transmission of the beacon frame, sends a frame to the STA (S932).

The AP 910 sends a fourth beacon frame (S914). However, STA1 921 could not obtain the information indicating that a bufferable frame for itself remains buffered through the previous twice reception of the TIM element, and thus, STA1 921 may adjust the wakeup interval for reception of a TIM element. Or, in case the beacon frame transmitted by the AP 910 includes signaling information for adjusting the wakeup interval value of STA1 921, the wakeup interval value of STA1 921 may be adjusted. In this example, STA1 921 may change its configuration so that shift of the operation state for receiving a TIM element is performed at every three beacon intervals rather than at every beacon interval. Accordingly, STA1 921 stays at the doze state after the AP 910 sends a fourth beacon frame (S914) and when the AP 910 transmits a fifth beacon frame (S915), and thus, it cannot obtain the TIM element.

When the AP 910 sends out a sixth beacon frame (S916), STA1 921 switches to the awake state and obtains the TIM element included in the beacon frame (S924). The TIM element is a DTIM indicating that there is a broadcast frame, so that STA1 921 does not transmit a PS-poll frame to the AP 910 and receives a broadcast frame transmitted by the AP 910 (S934).

Meanwhile, the wakeup interval configured in STA2 922 may have a longer period than that of STA1 921. Accordingly, when the AP 910 sends a fifth beacon frame (S915), STA2 922 may switch to the awake state to receive a TIM element (S925). STA2 922 is aware that there is a frame to be sent thereto through the TIM element, and in order to request transmission, sends a PS-poll frame to the AP 910 (S925a). The AP 910 sends a frame to STA2 922 in response to the PS-poll frame (S933).

In order to operate the power save mode as shown in FIG. 9, the TIM element includes a TIM indicating whether there is a frame to be sent to the STA or a DTIM indicating whether there is a broadcast/multicast frame. The DTIM may be embodied by configuring a field of the TIM element.

Figure 10:
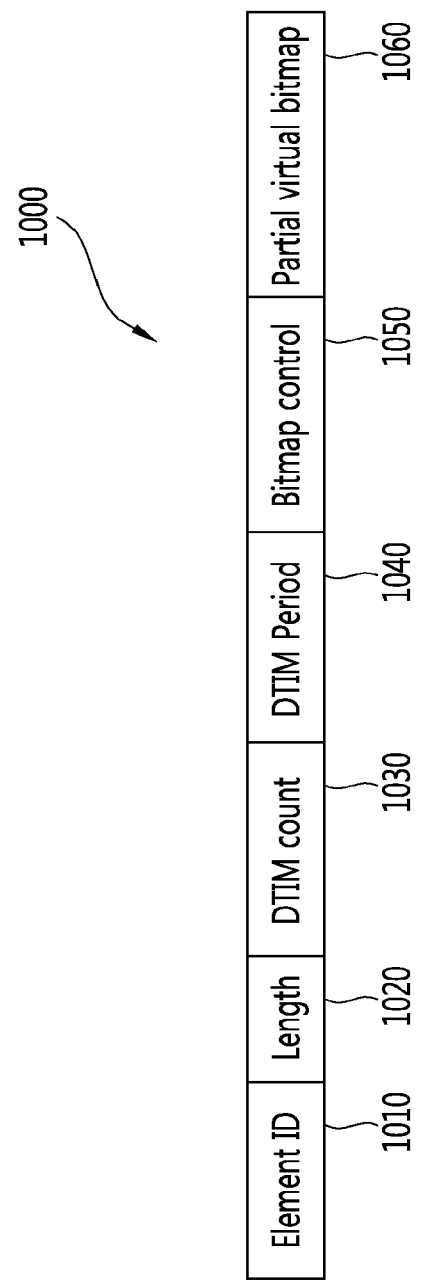
FIG. 10 is a block diagram illustrating an example of a TIM element format.

FIG. 10 is a block diagram illustrating an example of a TIM element format.

Referring to FIG. 10, the TIM element 1000 includes an element ID field 1010, a length field 1020, a DTIM count field 1030, a DTIM period field 1040, a bitmap control field 1050, and a partial virtual bitmap field 1060.

The element ID field 1010 indicates that an information element is a TIM element. The length field 1020 indicates the whole length including itself and subsequent fields. The maximum value may be 255 and may be set in octets.

The DTIM count field 1030 indicates whether a current TIM element is a DTIM, and unless it is a DTIM, indicates the number of remaining TIMs until the DTIM is transmitted. The DTIM period field 1040 indicates a period at which the DTIM is transmitted, and the period at which the DTIM is transmitted may be set as a multiple of the count of transmission of a beacon frame.

The bitmap control field 1050 and the partial virtual bitmap field 1060 indicate whether a specific STA buffers a bufferable frame. The first bit in the bitmap control field 1050 indicates whether there is a multicast/broadcast frame to be sent. The remaining bits are set to indicate an offset value to interpret the subsequent partial virtual bitmap field 1060.

The partial virtual bitmap field 1060 is set as a value indicating whether there is a bufferable frame to be sent to each STA. This may be set in the bitmap form where a bitmap corresponding to the AID value of a specific STA is set as 1. According to the AID order, allocation may be done from 1 to 2007, and as an example, if the fourth bit is set as 1, it means that traffic is buffered in the AP which is to be sent to the STA whose AID is4.

Meanwhile, in the circumstance where bits set as consecutive 0's come up frequently in configuring the bit sequence of the partial virtual bitmap field 360, using the whole bit sequence configuring the bitmap may be insufficient. For this, the bitmap control field 1050 may contain offset information for the partial virtual bitmap field 1060.

Figure 11:
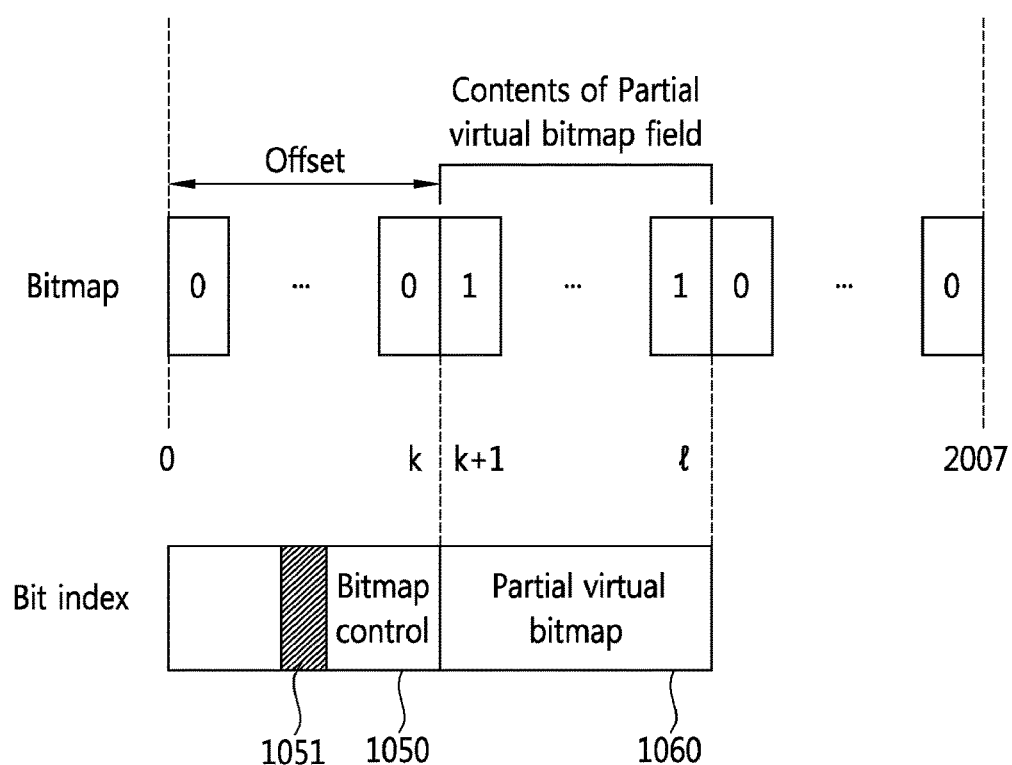
FIG. 11 is a view illustrating an example of a bitmap control field and a partial virtual bitmap field according to an embodiment of the present invention.

FIG. 11 is a view illustrating an example of a bitmap control field and a partial virtual bitmap field according to an embodiment of the present invention.

Referring to FIG. 11, the bitmap sequence constituting the partial virtual bitmap field 1060 indicates whether the STA having an AID corresponding to the bitmap index includes a buffered frame. The bitmap sequence constitutes indication information on AIDs 0 to 2007.

The bitmap sequence may have consecutive 0's from the first bit to the kth bit. Further, consecutive 0's may be set from the other lth bit to the last bit. This indicates that the STAs assigned AIDs 0 to k and the STAs assigned with 1 to 2007 do not have any buffered frame. As such, the sequence of consecutive 0's from 0th to the kth in the early part of the bitmap sequence may be provided offset information and the sequence of 0's in the latter part may be omitted, thereby reducing the size of the TIM element.

For this, the bitmap control field 1050 may include a bitmap offset subfield 1051 that contains offset information of a sequence of consecutive 0's in the bitmap sequence. The bitmap offset subfield 1051 may be set to indicate k, and the partial virtual bitmap field 1060 may be set to include the k+1th bit to the 1−1th bit of the original bitmap sequence.

A detailed responding procedure of the STA that has received the TIM element is described with reference to FIGS. 12 to 14.

Figure 12:
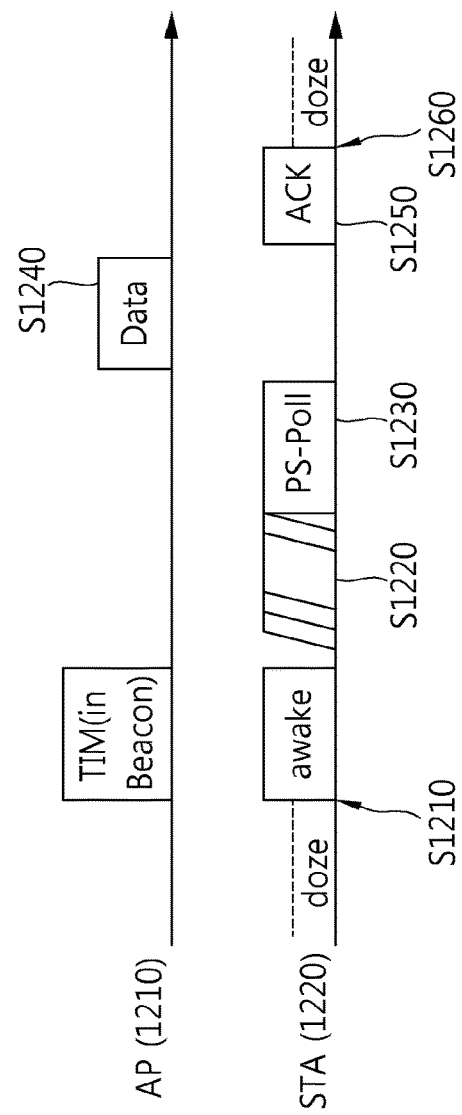
FIG. 12 is a flowchart illustrating an example of an AP's responding procedure in a TIM protocol.

FIG. 12 is a flowchart illustrating an example of an AP's responding procedure in a TIM protocol.

Referring to FIG. 12, the STA 1220 shifts its operation state from doze state to awake state in order to receive a beacon frame including a TIM from the AP 1210 (S1210). The STA 1220 may be aware that there is a buffered frame to be sent thereto by interpreting the received TIM element.

The STA 1220 contends with other STAs for medium access to transmit a PS-poll frame (S1220) and sends a PS-poll frame to the AP 1210 for requesting transmission of a data frame (S1230).

When receiving the PS-poll frame transmitted from the STA 1220, the AP 1210 sends a frame to the STA 1220 (S1240). The STA 1220 receives the data frame and in response transmits an ACK (acknowledgement) frame to the AP 1210 (S1250). Thereafter, the STA 1220 shifts its operating mode back into the doze state (S1260).

As shown in FIG. 12, the AP may transmit data at a specific time after receiving the PS-poll frame rather than sending a data frame right after receiving the PS-poll frame from the STA.

Figure 13:
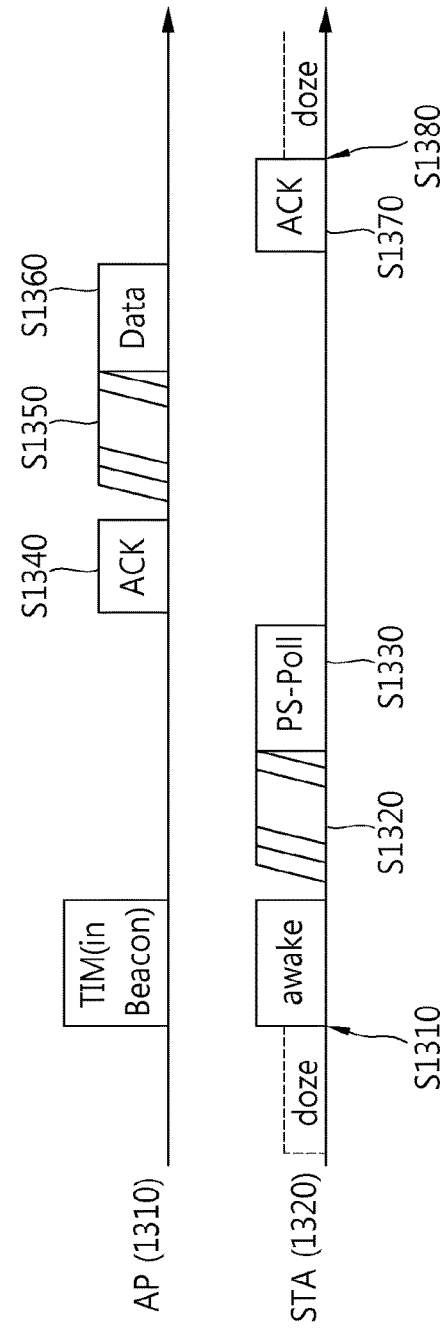
FIG. 13 is a flowchart illustrating another example of an AP's responding procedure in a TIM protocol.

FIG. 13 is a flowchart illustrating another example of an AP's responding procedure in a TIM protocol.

Referring to FIG. 13, the STA 1320 shifts its operation mode from doze state to awake state in order to receive a beacon frame including a TIM from the AP 1310 (S1310). The STA 1320 may be aware that there is a buffered frame to be sent thereto by interpreting the received TIM element.

The STA 1320 contends with other STAs for medium access for transmission of the PS-poll frame (S1320) and sends the PS-poll frame to the AP 1310 for requesting the transmission of a data frame (S1330).

In case, despite receiving the PS-poll frame, the AP 1310 fails to prepare for a data frame for a specific time interval, the AP 1310, instead of immediately transmitting a data frame, sends an ACK frame to the STA 1320 (S1340). This is a feature of a deferred response different from step S1240 in which the AP 1210 shown in FIG. 12 sends a data frame to the STA 1220 immediately in response to the PS-poll frame.

The AP 1310, if a data frame is ready after transmission of the ACK frame, performs contention (S1350), and then sends a data frame to the STA 1320 (S1360).

The STA 1320 sends an ACK frame to the AP 1310 in response to reception of the data frame (S1370) and switches its operation mode to the doze state (S1380).

If the AP sends a DTIM to the STA, a TIM protocol procedure that is performed thereafter may differ.

Figure 14:
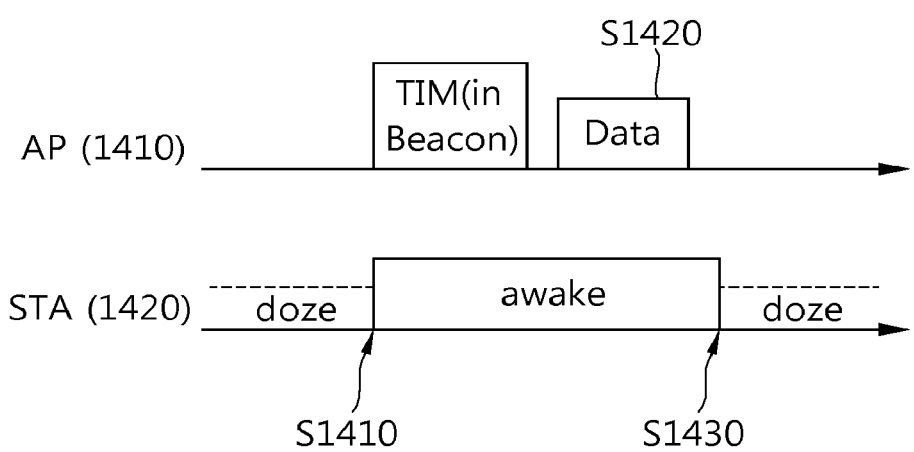
FIG. 14 is a flowchart illustrating a procedure of a TIM protocol by a DTIM.

FIG. 14 is a flowchart illustrating a procedure of a TIM protocol by a DTIM.

Referring to FIG. 14, STAs 1420 switch their operation mode from the doze state to the awake state in order to receive a beacon frame including a TIM element (S1410).

The STAs 1420 may be aware that a multicast/broadcast frame is to be transmitted through the received DTIM.

The AP 1410 sends out a multicast/broadcast frame after transmission of the beacon frame including the DTIM (S1420). The STAs 1420 switch their operation state back to the doze state after receiving the multicast/broadcast frame transmitted by the AP 1410.

In the power save mode operation method based on the TIM protocol described in connection with FIGS. 9 to 14, the STAs may verify whether there is a buffered frame to be transmitted due to buffered traffic through the STA identification information included in the TIM element. The STA identification information may be information associated with an AID (Association Identifier) that is an identifier assigned when the STA is associated with the AP. The STA identification information may be configured to directly indicate the AIDs of the STAs having a buffered frame or may be configured in the bitmap type in which a bit order corresponding to the AID value is set as a specific value. The STAs may be aware that there is a frame buffered thereto if the STA identification information indicates its AID.

Meanwhile, a power management operation based on APSD (Automatic Power Save Delivery) may also be offered in order for saving power of a station.

The AP that may support APSD signals that the APSD may be supported through use of the APSD subfield included in the capabilities information field of the association response frame, probe response frame, and beacon frame. The STA that may support APSD uses a power management field that is included in the frame control field of the frame in order to indicate whether it operates in the active mode or power save mode.

The APSD is a mechanism for delivering downlink data and a bufferable management frame to an STA that is operating in the power save mode. In the frame that is transmitted by the STA that stays in the power save mode and is using APSD, the power management bit of the frame control field is set as 1, and through this, buffering may arise in the AP.

The APSD defines two delivery mechanisms such as U-APSD (Unscheduled-APSD) and S-APSD (Scheduled-APSD). The STA may use the U-APSD so that part or whole of its BU (Bufferable Unit) is delivered during an unscheduled SP (Service Period). The STA may use the S-APSD so that part or whole of its BU is delivered during a scheduled SP.

The STA using the U-APSD might not receive a frame transmitted by the AP during a service period due to interference. Although the AP might not sense interference, the AP may determine that the STA failed to exactly receive the frame. The U-APSD co-existence capability value enables the STA to inform requested transmission duration to the AP so that it can be used as a service period for the U-APSD. The AP may transmit a frame during the service period, and accordingly, may enhance the possibility of being able to receive a frame while the STA is under interference. Further, the U-APSD may reduce possibility of failing to receive a frame transmitted from the AP during the service period.

The STA transmits to the AP an ADDTS (Add Traffic Stream) request frame including a U-APSD coexistence element. The U-APSD coexistence element may include information on the requested service period.

The AP treats the requested service period, and in response to the ADDTS request frame, may send an ADDTS response frame. The ADDTS request frame may include a state code. The state code may indicate response information on the requested service period. The state code may indicate whether the requested service period is allowed, and in case the requested service period is refused, may further indicate a reason for the refusal.

In case the requested service period is allowed by the AP, the AP may send a frame to the STA during the service period. The duration of the service period may be specified by the U-APSD coexistence element included in the ADDTS request frame. The start of the service period may be a time when the AP normally receives a trigger frame transmitted from the STA.

The STA may enter into the doze state if the U-APSD service period expires.

Meanwhile, as various communication services such as smart grid and e-Health, or ubiquitous services appear, the M2M (Machine to Machine) to support such services draws attention. A sensor for sensing temperature or moisture, a camera, a home appliance such as a TV, or a bulky machine including a factory processing machine or a vehicle may be one element of an M2M system. Elements constituting an M2M system may transmit and receive data based on WLAN communication. In case devices of an M2M system supports WLAN and configure a network, the system is hereinafter referred to as an M2M wireless LAN system.

An M2M-supportive wireless LAN system may make use of a frequency band of 1 GHz or more, and use of a low band frequency may cause the service coverage to be expanded. Accordingly, the number of wireless devices located in the service coverage may be larger than the number of wireless devices in the existing wireless LAN system. Further, the M2M-supportive wireless LAN system has the following features.

1) many STAs: M2M assumes that unlike the existing networks a great number of STAs are present in a BSS. This is because sensors installed in the home or business as well as devices owned by individuals are considered. Accordingly, a considerable number of STAs may be linked to one AP.

2) Low traffic load per STA: Since an M2M terminal has a traffic pattern of gathering ambient information and reporting, it need not be sent frequently and the amount of information is relatively small.

3) Uplink-centered communication: M2M has the structure of receiving a command mainly on downlink, taking action, and reporting resultant data on uplink. The main data is generally sent on uplink, and thus, an M2M-supportive system becomes uplink centered.

4) STA's power management: An M2M terminal is primarily battery powered, and in many cases, it is difficult to recharge often. Accordingly, a power management method is required to minimize battery consumption.

5) Automatic restoration function: A device constituting an M2M system is difficult for a human being to manipulate in a specific circumstance, and thus, the device requires a self-restoration function.

In accordance with a server/client structure in a general wireless LAN system, a client such as STA sends a request for information to a server, and the server sends information to the STA in response to the request. At the time, the server that has provided information may be considered a machine that mechanically collects and offers information, and the party that has received the information may be a user using the client. Due to such structural nature, downlink-oriented communication technology has been mainly developed in the existing wireless LAN systems.

On the contrary, in the M2M-supportive wireless LAN system, an opposite of the above structure applies. In other words, the client, a machine, gathers and provides information, and the user managing the server may request information. That is, in the M2M-supportive wireless LAN system, the M2M server issues a command related to ambient environment measurement to M2M STAs and the M2M STAs conduct operation per the command and report the collected information to the server, in general communication flow. Unlike the previous, the user happens to access the network in the side of the server, and the communication flow goes in the opposite direction. These are structural features of the M2M-supportive wireless LAN system.

In the above wireless LAN environment, a power save mechanism may be offered which prevents the STA from unnecessarily maintaining the awake state, and if identified that there is a buffered frame, enables the STA to switch to the awake state in order to receive the buffered frame.

The STA transmitting and receiving a frame based on the power save mechanism may be conducted based on the TIM protocol as shown in FIGS. 9 to 14. According to the TIM protocol, the AP sends a data frame after receiving a PS-poll frame from the STA, and in this case, the AP may transmit one buffered frame, i.e., a PSDU, in response to the PS-poll frame. Meanwhile, the AP transmitting only one buffered frame in response to the PS-poll frame in the environment where there is high buffered traffic for the STA is not efficient in view of traffic treatment.

To address the above problems, a U-APSD may apply to a method of transmitting and receiving a frame based on a TIM protocol. The STA may receive at least one or more frames from the AP during a service period for itself.

Figure 15:
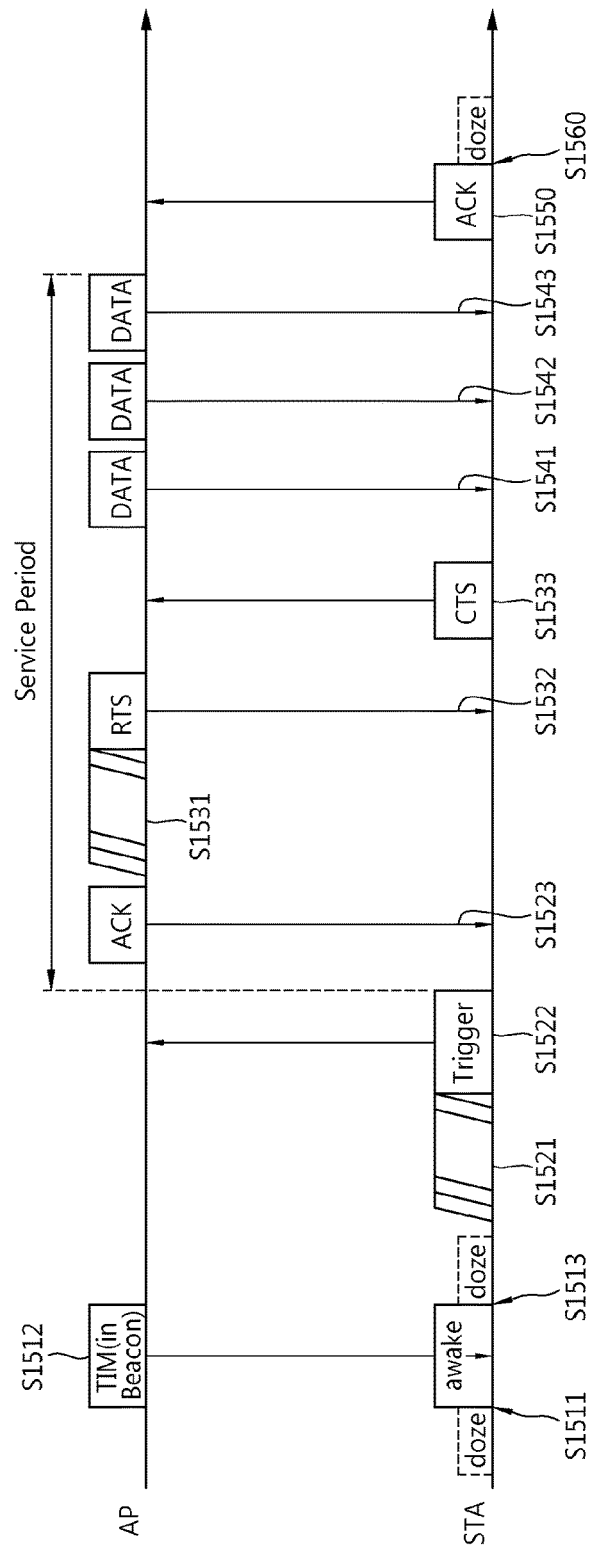
FIG. 15 is a view illustrating an example method of transmitting and receiving a frame based on a TIM protocol and U-APSD.

FIG. 15 is a view illustrating an example method of transmitting and receiving a frame based on a TIM protocol and U-APSD.

Referring to FIG. 15, the STA, which stays in the doze state, enters into the awake state in order to receive a TIM element (S1511).

The STA receives a TIM element (S1512). The TIM element may be transmitted, included in a beacon frame. When receiving the TIM element, the terminal may determine whether a bufferable frame for itself is being buffered based on the AID of the STA and the bitmap sequence of the partial virtual bitmap field included in the TIM element.

When identifying that there is a buffered frame, the STA enters back into the doze state (S1513).

At a time when the buffered frame desires to be transmitted, the STA switches back to the awake state and obtains a channel access authority through contention (S1521). The STA acquires the channel access authority and transmits a trigger frame to thereby notify that a service period for the STA has been initiated (S1522).

The AP sends an ACK frame to the STA in response to the trigger frame (S1523).

The AP may conduct an RTS/CTS exchange procedure to transmit a buffered frame within a service period. The AP obtains a channel access authority through contention in order to send an RTS frame (S1531). The AP transmits an RTS frame to the STA (S1532), and the STA sends a CTS frame to the AP in response thereto (S1533).

The AP transmits a data frame related to at least a buffered frame after RTS/CTS exchange at least once or more (S1541, S1542, and S1543). If the AP conducts the last transmission of a frame with (EOSP) in the QoS service field of the frame set as '1,' the STA may then receive the last frame and may recognize that the service period is to be terminated.

The STA sends an ACK frame to the AP in response to the, at least, one frame received when the service period is terminated (S1550). At the time, the ACK frame may be a block ACK, an acknowledgement of reception for a plurality of frames. The STA that has transmitted the ACK frame enters into the doze state (S1560).

By the frame transmission/reception method described above in connection with FIG. 15, the STA may begin the service period at a desired time and may receive at least one or more frames during one service period. Accordingly, efficiency may be enhanced in light of traffic processing.

Meanwhile, in the above-described frame transmission/reception method, the RTS/CTS frame exchange required upon transmission of data in order to prevent a hidden node problem puts heavy overhead on data transmission. Further, in the U-APSD, it takes a while after the STA sends a trigger frame to request that the AP send data and the AP then prepares for data to be sent and subsequently conducts contention for data transmission. Since the STA may happen to unnecessarily maintain the awake state for the time, the power save efficiency may be lowered.

Accordingly, the present invention suggests a method of being able to more efficiently transmit a data frame that is prepared for transmission to the STA by the AP in advance starting a service period at a scheduled time between the AP and the STA when the STA receives data from the AP.

For this the present invention suggests an SP (Service Period)-poll frame.

Figure 16:
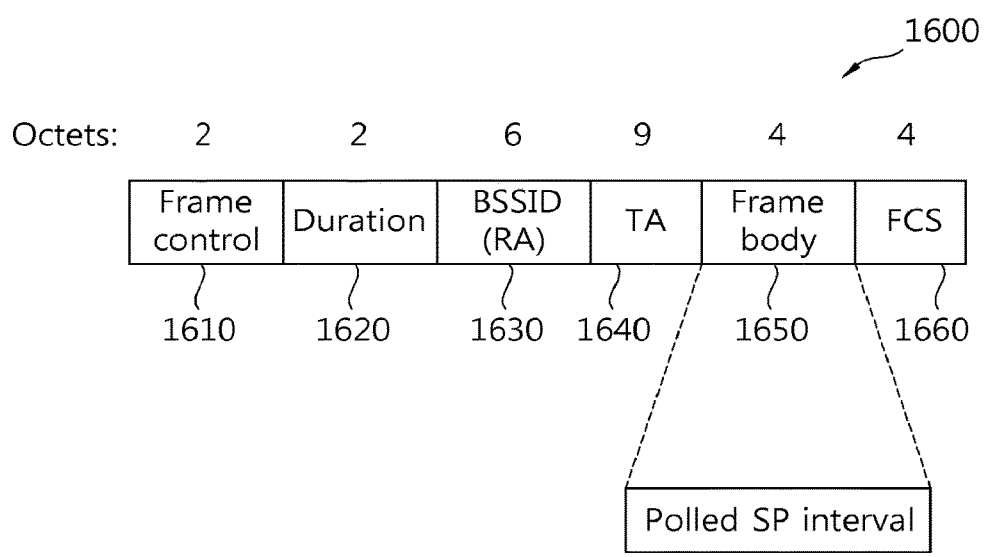
FIG. 16 is a block diagram illustrating an MAC frame format of an SP-poll frame according to an embodiment of the present invention.

FIG. 16 is a block diagram illustrating an MAC frame format of an SP-poll frame according to an embodiment of the present invention.

Referring to FIG. 16, the SP-poll frame 1600 may include a frame control field 1610, a duration field 1620, a BSSID (RA) field 1630, a TA field 1640, a frame body 1650, and an FCS field 1660.

The frame control field 1610 may indicate that the frame is an SP-poll frame.

The duration field 1620 may indicate duration of a polled service period initiated by the SP-poll frame 1600. The duration field 1620 may be a basis for configuring an NAV (Network Allocation Vector) of other STA that does not send the SP-poll frame 1600.

The BSSID(RA) field 1630 may include identification information of the AP or identification information of the BSS operated by the AP associated with the STA. The identification information may be a BSSID.

The TA field 1640 may include identification information of the STA that has transmitted the SP-poll frame 1600. The identification information may be the MAC address of the STA. The identification information may include an AID of the STA.

The frame body 1650 may include a polled service period interval (polled SP interval) field. The polled service period field may include information related to the polled SP interval that is an interval between when the service period initiated by the SP-poll frame 1600 expires and when a subsequent service period is initiated. The polled SP field may include information related to a time when the SP-poll frame 1600 is transmitted and then a next SP-poll frame is transmitted.

The FCS field 1660 may include a sequence for CRC.

The polled SP field indicating the interval between service periods and/or interval in the transmission between SP-poll frames may be set to indicate that the interval value is 0 and/or Null. This may be to indicate that the polled service period is initiated by the SP-poll frame transmitted by the STA and at least one or more frames are to be transmitted from the AP within the service period. Further, the field thusly set may be to indicate not considering that after the polled service period initiated by the SP-poll frame, a polled service period is initiated again to transmit and receive a buffered frame.

The frame transmission/reception method by the power save mode STA based on the above-described SP-poll frame may be split into an immediate SP-poll mechanism and a deferred SP-poll mechanism depending on the response of the AP that has received the SP-poll frame.

Figure 17:
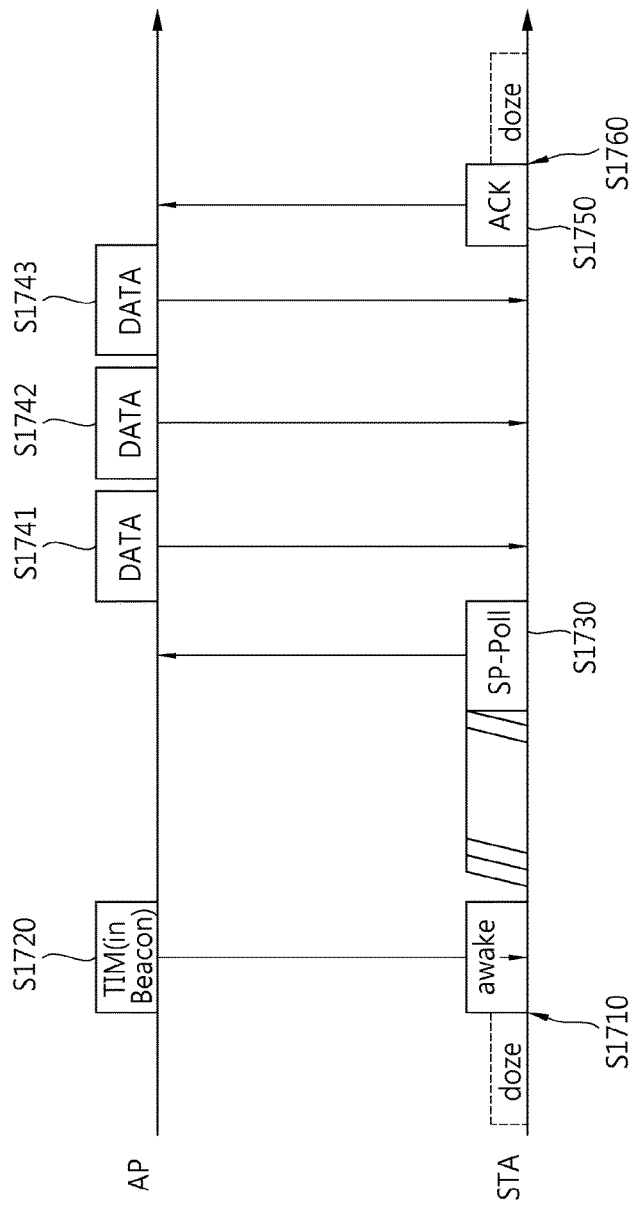
FIG. 17 is a view illustrating an example method of transmitting and receiving a frame by an STA operating in a power save mode according to another embodiment of the present invention.

FIG. 17 is a view illustrating an example method of transmitting and receiving a frame by an STA operating in a power save mode according to another embodiment of the present invention. The frame transmission and reception method shown in FIG. 17 may be an example of a frame transmission and reception method according to the immediate SP-poll mechanism.

Referring to FIG. 17, the STA that stays in the doze state enters into the awake state in order to receive a TIM element (S1710).

The STA receives the TIM element (S1720). The TIM element may be transmitted, included in a beacon frame. When receiving the TIM element, the terminal may determine whether a bufferable frame for itself is being buffered based on the AID of the STA and the bitmap sequence of the partial virtual bitmap field included in the TIM element.

When identifying that a bufferable frame is being buffered, the STA obtains a channel access authority through contention and may send a request for transmission of a buffered frame to the AP through transmission of an SP-poll frame (S1730).

When receiving the SP-poll frame, the AP sends at least one or more buffered frames to the STA after the SIFS (S1741, S1742, and S1743). In such case, the AP may continuously transmit a plurality of buffered frames during a polled service period.

In case a specific polled service period is not configured through separate signaling between the AP and the STA, the EOSP value may be set as 1 in the last buffered frame that is transmitted from the AP to the STA during the polled service period. Through this, the polled service period between the STA and the AP may expire.

On the contrary, a specific polled service period may be configured through separate signaling between the AP and the STA. For this, the duration field of the SP-poll frame transmitted from the STA may apply. In such case, the polled service period may be initiated at a time when the STA sends the SP-poll frame or when the AP receives the SP-poll frame. The polled service period may be configured during the time period indicated by the duration field from the time of initiation. The AP may send a buffered frame in compliance with the duration of the polled service period. The STA may receive a buffered frame in accordance with the duration of the polled service period.

The STA may send an ACK frame to the AP (S1750). The STA enters into the doze state after transmitting the ACK frame (S1760). The ACK frame may be sent at a time when the polled service period expires.

Figure 18:
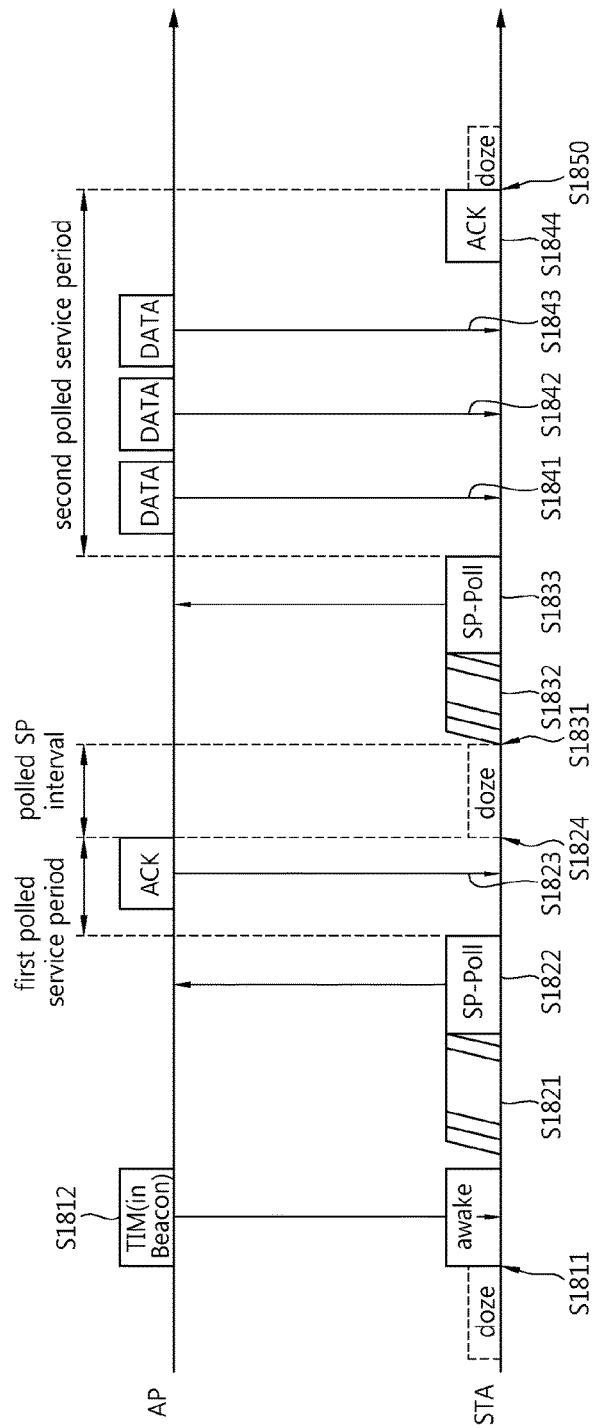
FIG. 18 is a view illustrating another example of a method of transmitting and receiving a frame by an STA operating in a power save mode according to another embodiment of the present invention.

FIG. 18 is a view illustrating another example of a method of transmitting and receiving a frame by an STA operating in a power save mode according to another embodiment of the present invention. The frame transmission and reception method shown in FIG. 18 is based on the deferred SP-poll mechanism.

Referring to FIG. 18, the STA that stays in the doze state enters into the awake state in order to receive a TIM element (S1811).

The STA receives the TIM element (S1812). The TIM element may be sent included in a beacon frame. When receiving the TIM element, the terminal may determine whether a bufferable frame for itself is being buffered based on the AID of the STA and the bitmap sequence of the partial virtual bitmap field included in the TIM element.

When identifying that a bufferable frame is being buffered, the STA obtains a channel access authority through contention (S1821) and may send a request for transmission of a buffered frame to the AP through transmission of an SP-poll frame (S1822). As the SP-poll frame is transmitted, a first polled service period may be initiated.

Meanwhile, the AP, after receiving the SP-poll frame, might not send a buffered frame to the STA within the SIFS. In such case, the AP transmits an ACK frame after receiving the SP-poll frame (S1823).

When receiving the ACK frame in response to the transmitted SP-poll frame, the STA may recognize that the AP cannot send a buffered frame. In this case, the first polled service period that has been initiated by transmission of the SP-poll frame may expire. The STA receives an ACK frame and enters into the doze state (S1824).

Meanwhile, the STA enters into the awake state at a time indicated by the polled SP interval field of the SP-poll frame (S1831) and obtains a channel access authority through contention (S1832).

When obtaining the channel access authority, the STA requests that the AP send a frame through transmission of the SP-poll frame (S1833). A second polled service period begins through the transmission of the SP-poll frame.

Meanwhile, the AP may previously grasp the time when the STA intends to initiate the second polled service period through the polled SP interval field of the received SP-poll frame. As an example, in case the polled SP interval field indicates an interval between two polled service periods, it can be possible to know the time when the STA intends to initiate the second polled service period and receives a buffered frame by interpreting the polled SP interval field of the SP-poll frame in step S1822. As another example, in case the polled SP interval field indicates an interval when the STA that has already transmitted an SP-poll frame intends to send a subsequent SP-poll frame, the AP may know the time that the STA intends to send an SP-poll frame by construing the polled SP interval field included in the SP-poll frame in step S1822. However, FIG. 18 illustrates a polled SP interval when it is assumed that the polled SP interval field indicates the time when a next SP-poll frame is intended to be sent.

Accordingly, the AP may prepare for a buffered frame to be transmitted to the STA an SIFS after receiving the SP-poll frame. The AP may transmit one or more buffered frames to the STA during the second polled service period the SIFS after receiving the SP-poll frame (S1841, S1842, and S1843).

The duration of the second polled service period initiated by the STA transmitting the SP-poll frame (S1833) may be specified as the duration of the polled period described above in connection with FIG. 17. That is, the polled duration may be terminated by the AP sending out a buffered frame including an EOSP field set as 1. Or, the second polled duration may be specified by the duration indicated by the duration field of the SP-poll frame transmitted by the STA in step S1833.

The STA receives at least one or more frames from the AP, and in response, transmits an ACK frame (S1844). The ACK frame transmitted by the STA may be a block ACK as a response to acknowledge reception of at least one or more buffered frames. The STA may enter into the doze state after transmitting the ACK frame (S1850).

Although in FIG. 18 the second polled service period expires after the STA sends the ACK frame, the second polled service period may be terminated right before the STA transmits the ACK frame. That is, the STA may be configured to transmit an ACK frame to the AP when the second polled service period ends.

In the frame transmission and reception method shown in FIG. 18, the AP during the first polled service period transmits an ACK frame in response to the STA's SP-poll frame. Accordingly, during the first polled service period, a deferred SP-poll-based frame transmission and reception method is carried out. During the second polled service period, the AP sends at least one buffered frame in response to the STA's SP-poll frame. Accordingly, an immediate SP-poll-based frame transmission and reception method is conducted during the second polled service period.

Meanwhile, since the period during which one STA can occupy a channel is limited, there is a limit to the amount of data that may be sent from the AP to the STA during one polled service period. Accordingly, heavy traffic buffered for the STA may render it difficult to process all the buffered frames by sending the buffered frames during one polled service period. In such case, the buffered traffic may be treated through resuming the polled service period. The time of the start of a subsequent polled service period may be signaled by the polled SP interval field of the SP-poll frame that triggers an immediately prior polled service period. This is described below in greater detail with reference to drawings.

Figure 19:
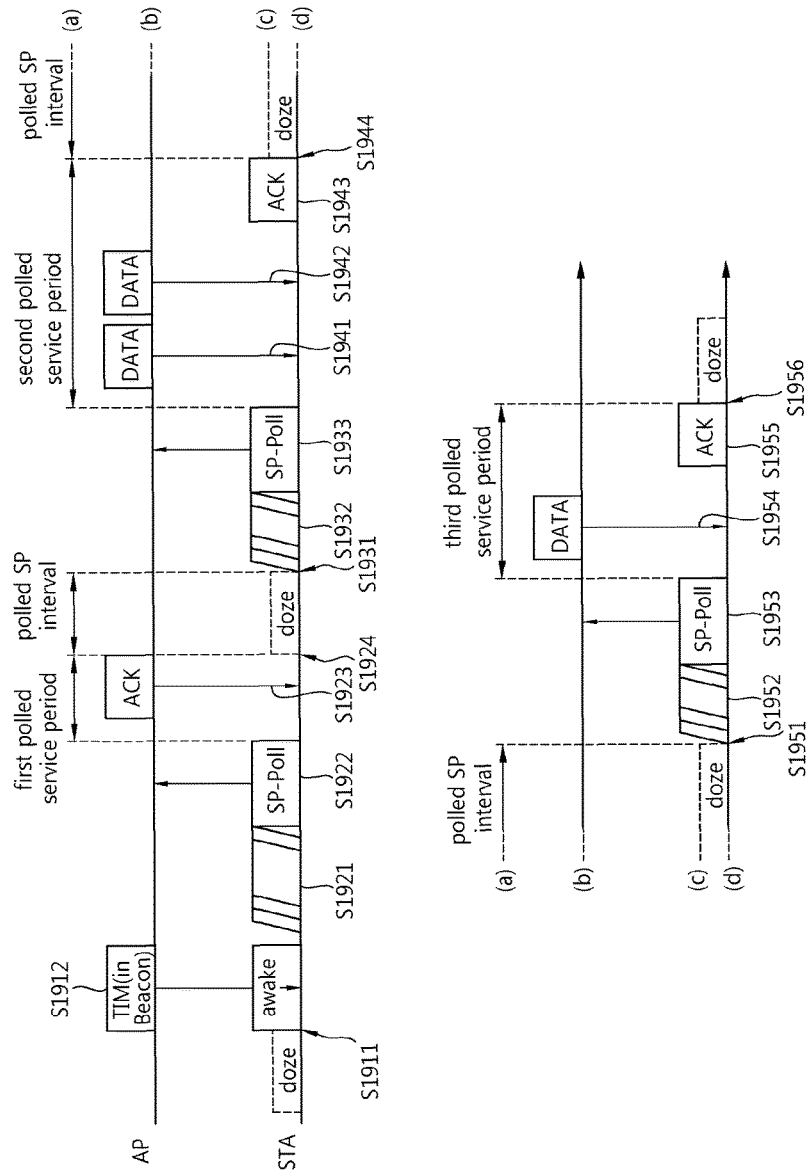
FIG. 19 is a view illustrating another example of a method of transmitting and receiving a frame by an STA operating in a power save mode according to an embodiment of the present invention.

FIG. 19 is a view illustrating another example of a method of transmitting and receiving a frame by an STA operating in a power save mode according to an embodiment of the present invention.

Referring to FIG. 19, the STA switches from the doze state to the awake state so as to receive a TIM element (S1911).

The STA receives the TIM element (S1912). The TIM element may be transmitted included in a beacon frame. When receiving the TIM element, the terminal may determine whether a bufferable frame for itself is being buffered based on the AID of the STA and the bitmap sequence of the partial virtual bitmap field included in the TIM element.

When identifying that a bufferable frame is being buffered, the STA obtains a channel access authority through contention (S1921) and may send a request for transmission of a buffered frame to the AP through the SP-poll frame (S1922). By the transmission of the SP-poll frame, a first polled service period may be initiated.

Meanwhile, the AP might not send a buffered frame to the STA an SIFS after receiving the SP-poll frame. In this case, the AP sends an ACK frame after receiving the SP-poll frame (S1923).

When receiving the ACK frame in response to the SP-poll frame, the STA may recognize that the AP cannot send a buffered frame. In such case, the first polled service period initiated by transmission of the SP-poll frame may be terminated. The STA sends out an ACK frame and enters into the doze state (S1924).

Meanwhile, the STA enters into the awake state at the time indicated by the polled SP interval field of the SP-poll frame (S1931) and obtains a channel access authority through contention (S1932).

When obtaining the channel access authority, the STA requests that the AP send a frame through transmission of the SP-poll frame (S1933). A second polled service period is initiated through transmission of the SP-poll frame.

The AP receives the SP-poll frame and may send at least one buffered frame to the STA during the second polled service period (S1941 and S1942). In this example, the second polled service period is assumed to be as long as the AP may send the buffered frame to the STA twice.

Even when the AP has more traffic buffered for the STA than the amount of traffic that may be treated by sending out the buffered frame two times, the AP cannot exceed two times in transmitting the buffered frame. Accordingly, the AP needs to inform the STA that there is still data to be transmitted to the STA. This may be signaled through the MD (More Data) field of the frame control field in the frame.

The AP may conduct transmission with the MD field of the second buffered frame sent in step S1942 set as 1 in order to signal the STA that data still remains to be sent. The STA may be aware that the AP has for data to be transmitted by receiving the second buffered frame and identifying the MD field of the frame control field.

The STA sends an ACK frame to the AP as a response to acknowledge reception of the buffered frame received during the second polled service period (S1943). If the second polled service period expires, it enters into the doze state (S1944).

The STA may request that a buffered frame be sent by sending an SP-poll frame again. For this, the STA enters into the awake state at the time indicated by the polled SP interval field of the SP-poll frame transmitted in step S1933 (S1951) and obtains a channel access authority through contention (S1952).

When obtaining the channel access authority, the STA requests that the AP send a buffered frame through the SP-poll frame (S1953). Through the transmission of the SP-poll frame, a third polled service period is initiated.

The AP may send a buffered frame to the STA during the initiated second polled service period an SIFS after receiving the SP-poll frame (S1954). At the time, the AP may send a remaining buffered frame that was not transmitted during the second polled service period.

The STA sends an ACK frame in response to the buffered frame received from the AP (S1955) and enters into the doze state (S1956).

In the frame transmission and reception method according to FIG. 19, the AP sends an ACK frame during the first polled service period in response to the STA's SP-poll frame. Accordingly, a deferred SP-poll mechanism-based frame transmission and reception method is conducted during the first polled service period. During the second polled service period and third polled service period, the AP sends at least one buffered frame in response to the SP-poll frame. Accordingly, an immediate SP-poll mechanism-based frame transmission and reception method is performed during the second polled service period and the third polled service period.

According to the frame transmission and reception method illustrated in FIGS. 17 to 19, the STA may receive a beacon frame from the AP during multiple counts of a polled service period, and enter into the doze state between the polled service periods, so that power consumption may be prevented. Further, the STA may receive at least one or more buffered frames during one polled service period, thus enabling efficient data transmission and reception. In addition, since the AP may send a buffered frame during a service period even without conducting RTS/CTS exchange in order to transmit a buffered frame, the frame transmission and reception efficiency may be further enhanced.

When the STA obtains a buffered frame from the AP based on the frame transmission and reception method according to the above-described embodiments, a device may be needed to prevent collision with frames transmitted and received by other STAs. For such purpose, other STAs may configure an NAV (Network Allocation Vector) based on the SP-poll frame transmitted from the STA.

Figure 20:
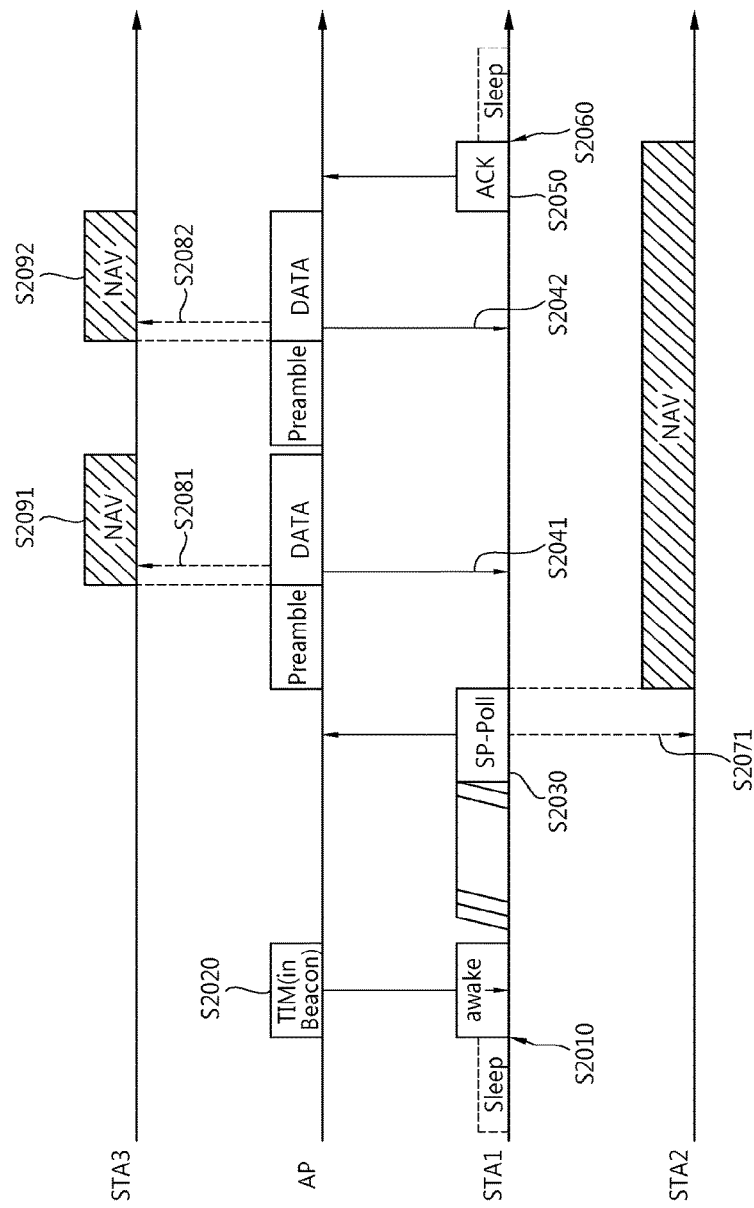
FIG. 20 is a view illustrating another example method of transmitting and receiving a frame according to an embodiment of the present invention.

FIG. 20 is a view illustrating another example method of transmitting and receiving a frame according to an embodiment of the present invention. In the example illustrated in FIG. 20, it is assumed that STA1 and STA3 are located in the service coverage of the AP and that STA2 is located in the coverage of STA1.

Referring to FIG. 20, STA1 enters into the awake state in order to receive a TIM element (S2010) and STA1 receives a TIM element (S2020).

When verifying that a bufferable frame is being buffered based on the TIM element, the STA transmits an SP-poll frame to the AP (S2030).

The AP may send the buffered frame to the STA during a polled service period initiated by transmission of the SP-poll frame (S2041 and S2042).

If the polled service period expires, STA1 sends an ACK frame to the AP (S2050) and enters into the doze state (S2060).

Since STA2 is positioned outside the service coverage of the AP, STA2 cannot receive a frame transmitted from the AP. On the contrary, STA1 is positioned within the coverage and thus may receive a frame transmitted by STA1. S12 may overhear the SP-poll frame transmitted from STA1 (S2071). Accordingly, STA2 verifies the duration of the polled service period through the duration field of the SP-poll frame and may configure an NAV during the duration (S2072). As the NAV is configured by STA2, collision between STA1 and STA2 may be prevented.

STA3 is located in the service coverage of the AP and thus may receive a frame received by the AP. In contrast, since STA3 is off the coverage of STA1, STA3 cannot receive a frame transmitted from STA1. In this case, STA3 may overhear buffered frames transmitted from the AP (S2081 and S2082).

STA3 may configure an NAV based on the duration information contained in the MAC header and/or preamble of the buffered frame transmitted from the AP (S2091 and S2092). Accordingly, collision between STA3 and AP may be prevented.

In case the AP has a small amount of buffered traffic and thus the duration of the polled service period actually initiated by the STA is long, the AP may process all the buffered traffic through a small count of transmission of the buffered frame, whereas the STA may stay accessing the channel during the duration of the polled service period. This is not good in light of efficiency of radio sources and power consumption efficiency of the STA. To prevent this, a need exists for a method of enabling the STA to forcedly terminate the polled service period specified by the duration field of the SP-poll frame transmitted from the STA even when the polled service period is not terminated to thereby enhance efficiency-related capabilities.

Figure 21:
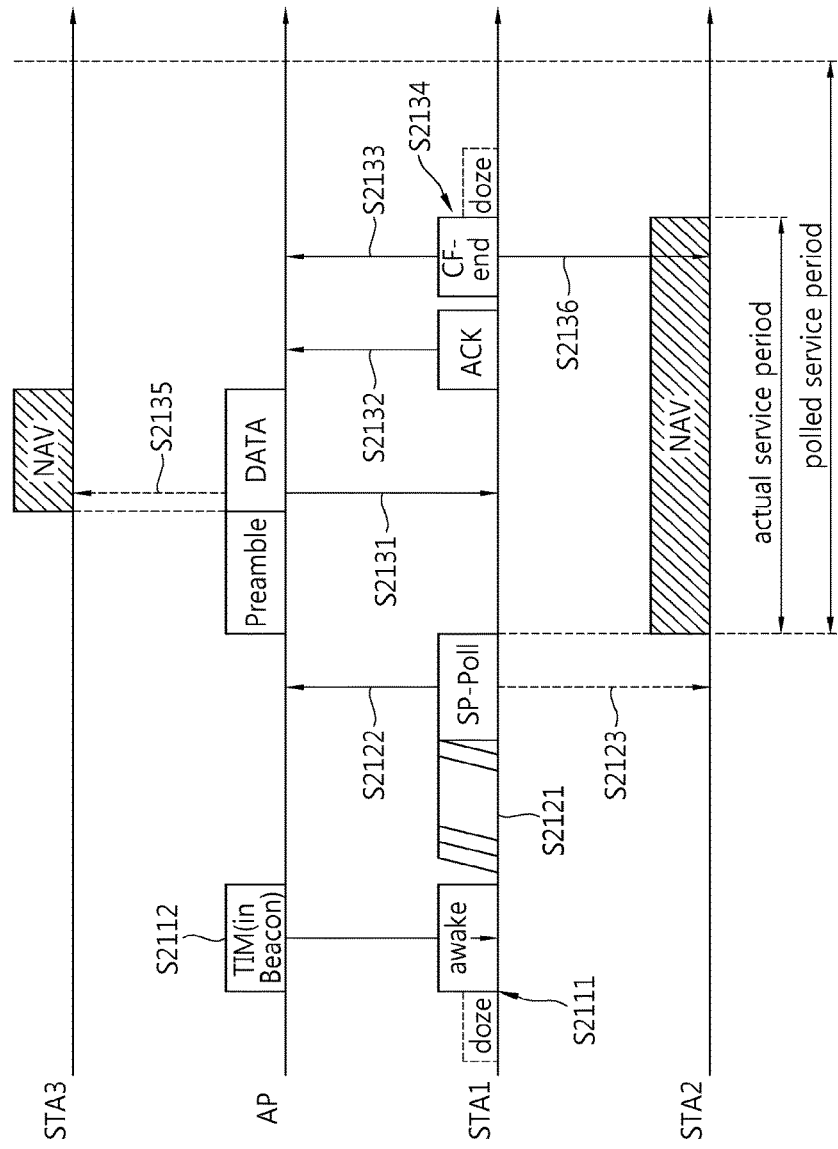
FIG. 21 is a flowchart illustrating another example method of transmitting and receiving a frame according to an embodiment of the present invention.

FIG. 21 is a flowchart illustrating another example method of transmitting and receiving a frame according to an embodiment of the present invention.

Referring to FIG. 21, STA1 switches from the doze state to the awake state in order to receive a TIM element (S2111) and receives a TIM element (S2112).

When identifying based on the TIM element that a bufferable frame is being buffered, STA1 obtains a channel access authority through contention (S2121) and sends a SP-poll frame to the AP (S2122). A polled service period is initiated by the SP-poll frame transmitted by STA1.

STA2 is located outside the service coverage of the AP and thus cannot receive a frame transmitted from the AP. In contrast, since STA2 is positioned in the coverage of STA1, STA2 may receive a frame transmitted from STA1. STA2 may overhear a SP-poll frame transmitted from STA1 (S2123). Accordingly, STA2 may identify the duration of the polled service period through the duration field of the SP-poll frame and may configure an NAV during the duration.

The AP receives the SP-poll frame and sends a buffered frame to the STA during the initiated polled service period (S2131).

STA1 receives a buffered frame from the AP, and when identifying that the AP does not send any more buffered frame, transmits an ACK frame to the AP as a response to acknowledge reception of the received buffered frame (S2132). Thereafter, STA1 may broadcast a CF (Contention Free)-end (CF-end) frame in order to arbitrarily terminate the polled service period (S2133).

When arbitrarily terminating the polled service period by sending out the CF-end frame, STA1 enters into the doze state (S2134).

Since STA3 is positioned in the service coverage of the AP, STA3 may receive a frame transmitted from the AP. On the contrary, since STA3 is positioned outside the coverage of STA1, STA3 cannot receive a frame transmitted from STA1. In this case, STA3 may overhear a buffered frame transmitted from the AP (S2135).

STA3 may configure an NAV during the period when the buffered frame is transmitted based on the duration information contained in the MAC header and/or preamble of the buffered frame by the AP.

Since STA2 is located in the service coverage of STA1, STA2 may receive the CF-end frame transmitted from STA1 (S2136). When receiving the CF-end frame, STA2 may terminate the NAV configured per the duration field of the SP-poll frame if the reception of the CF-end frame is complete. Accordingly, STA2 may try to access the channel if the service period is actually ended.

By the frame transmission and reception method according to FIG. 21, the STA may control a polled service period per the transmission state of the AP's buffered frame. This may prevent the phenomenon that as the polled service period initiated by the SP-poll frame is unnecessarily maintained, even when transmission of the buffered frame from the AP is not actually required, the STA keeps holding a channel access authority, so that the channel is unnecessarily occupied. Further, other STAs that are positioned in the STA and/or the AP may also acquire a channel access authority by adjusting the NAV according to a service period actually adjusted. Accordingly, the overall throughput of the wireless LAN system may be enhanced.

In the above-described various frame transmission and reception methods, the information related to the polled SP interval is signaled, included in the polled SP interval field of the SP-poll frame transmitted from the STA. Meanwhile, in order for the AP and STA to share the polled SP interval, a method for the AP to signal the STA with polled SP interval-related information may be offered. For this, a polled SP interval information element containing the polled SP interval-related information is provided.

Figure 22:
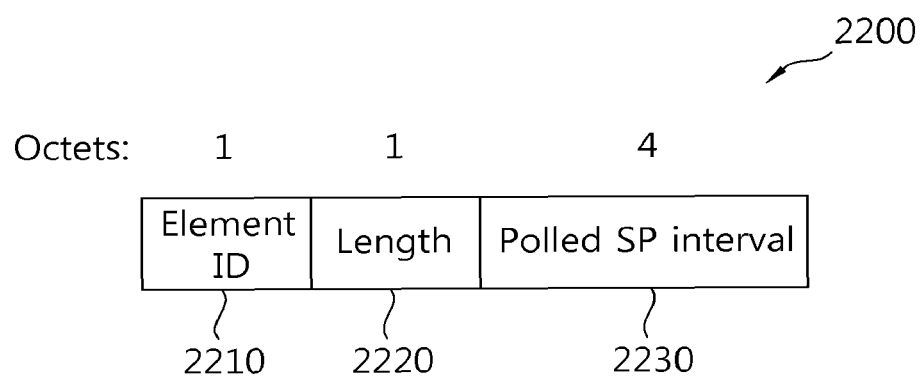
FIG. 22 is a block diagram illustrating the format of a polled SP interval information element according to an embodiment of the present invention.

FIG. 22 is a block diagram illustrating the format of a polled SP interval information element according to an embodiment of the present invention.

Referring to FIG. 22, the polled SP interval information element 2200 includes an element ID field 2210, a length field 2220, and a polled SP interval field 2230.

The element ID field 2210 may be configured to indicate that the information element is a polled SP interval information element.

The length field 2220 may be configured to indicate the length of the polled SP interval field 2230.

The polled SP interval field 2230 may be configured to indicate an interval between after a specific polled service period is ended and until a next polled service period begins. Or, the polled SP interval field 2230 may be configured to indicate an interval between transmission of a specific SP-poll frame and transmission of a subsequent SP-poll frame.

The polled SP interval information element 2200 may be included in an association response frame and/or probe response frame transmitted from the AP. When receiving the association response frame or probe response frame, the STA sends an SP-poll frame according to the polled SP interval indicated by the polled SP interval information element 2200 included and initiate a polled service period.

By a method of the AP signaling the STA with information on a polled service period, another information element may be defined. A response time information element is suggested below as information element for such purpose.

Figure 23:
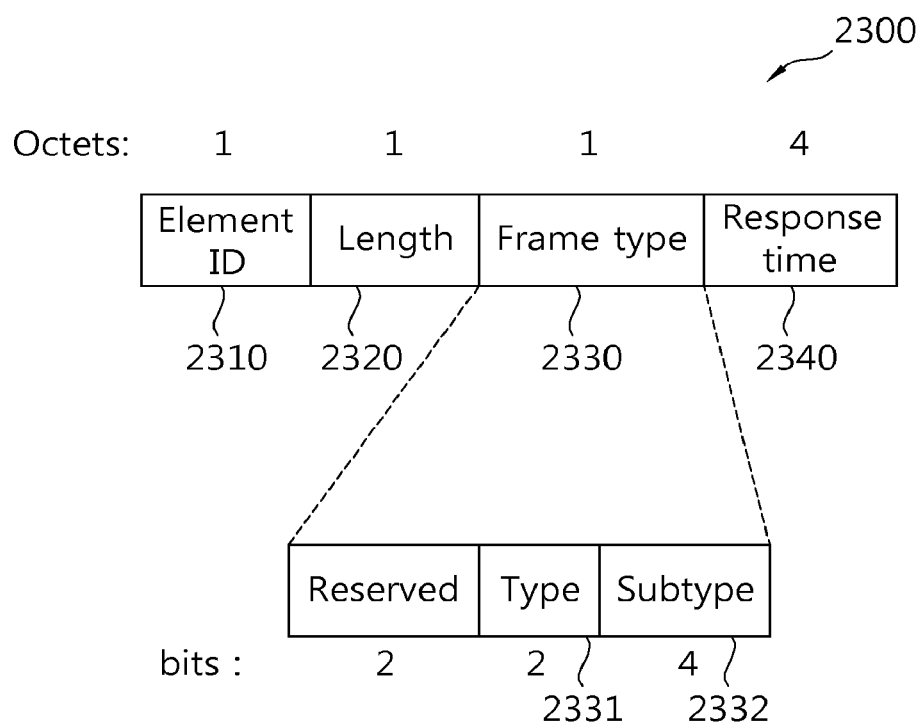
FIG. 23 is a block diagram illustrating the format of a response time information element according to an embodiment of the present invention.

FIG. 23 is a block diagram illustrating the format of a response time information element according to an embodiment of the present invention.

Referring to FIG. 23, the response time information element 2300 includes an element ID field 2310, a length field 2320, a frame type field 2330, and a response time field 2340.

The element ID field 2310 may be configured to indicate that the information element is the response time information element 2300.

The length field 2320 may be configured to indicate the length of the response time field 2340 and the frame type field 2330 that are included thereafter.

The frame type field 2330 may include a type subfield 2331 and a subtype field 2332. The type subfield 2331 may indicate the type of a frame, i.e., whether a frame is a management frame, a control frame, and/or a data frame. The subtype field 2332 may indicate the subtype of each type of frame.

The response time field 2340 may include information on an expected response time for each frame type that is supposed to be transmitted by the AP as a response to the SP-poll frame transmitted by the STA.

The information elements shown in FIGS. 22 and 23 may be transmitted, included in an association response frame during an association procedure between the AP and the STA or included in a probe response frame during a scanning procedure. Signaling the information element during the association procedure and/or scanning procedure may be to promise a polled SP interval between the AP and the STA. Accordingly, the STA may send an SP-poll frame and then send again a SP-poll frame according to the polled SP interval indicated by the response time information element and/or polled SP interval information element to thereby initiate a polled service period, and the AP may send at least one buffered frame to the STA during the service period initiated by the STA.

Meanwhile, the polled SP interval by the information elements shown in FIGS. 22 and 23 may be a basic interval scheduled between the STA and the AP. That is, even though a polled SP interval has been scheduled by transmission of the information elements through an association procedure and/or scanning procedure, in case the STA conducts transmission with polled SP interval-related information set as a specific value included in the SP-poll frame, the STA and the AP may carry out a frame transmission and reception procedure based on the polled SP interval-related information indicated by the SP-poll frame.

Additionally, the polled SP interval-related information such as the information elements shown in FIGS. 22 and 23 may be transmitted by the AP, and may be thus signaled. The AP sends an ACK frame in response to the STA's SP-poll frame.

The SP-poll frame may have the format shown in FIG. 16, and the duration of the polled service period initiated by the SP-poll frame may be specified by the duration field of the SP-poll frame. On the contrary, in this embodiment, the SP-poll frame might not contain the polled SP interval field.

The ACK frame may include polled SP interval-related information. By way of example, the ACK frame may contain an information element having the format shown in FIG. 22 or FIG. 23. In case the polled SP interval information element shown in FIG. 22 is included, the polled SP interval field may indicate a time when after transmission of the ACK frame, the AP intends to initiate transmission of a buffered frame, i.e., a time when a polled service period is intended to be started. In case the response time information element shown in FIG. 23 is included, the response time field may indicate a time when after transmission of the ACK frame, the AP intends to initiate transmission of a buffered frame, i.e., a time when a polled service period is intended to begin. According to the polled SP interval-related information, the frame transmission and reception method may be immediate SP-poll based or deferred SP-poll based. Hereinafter, this is described in greater detail with reference to drawings.

Figure 24:
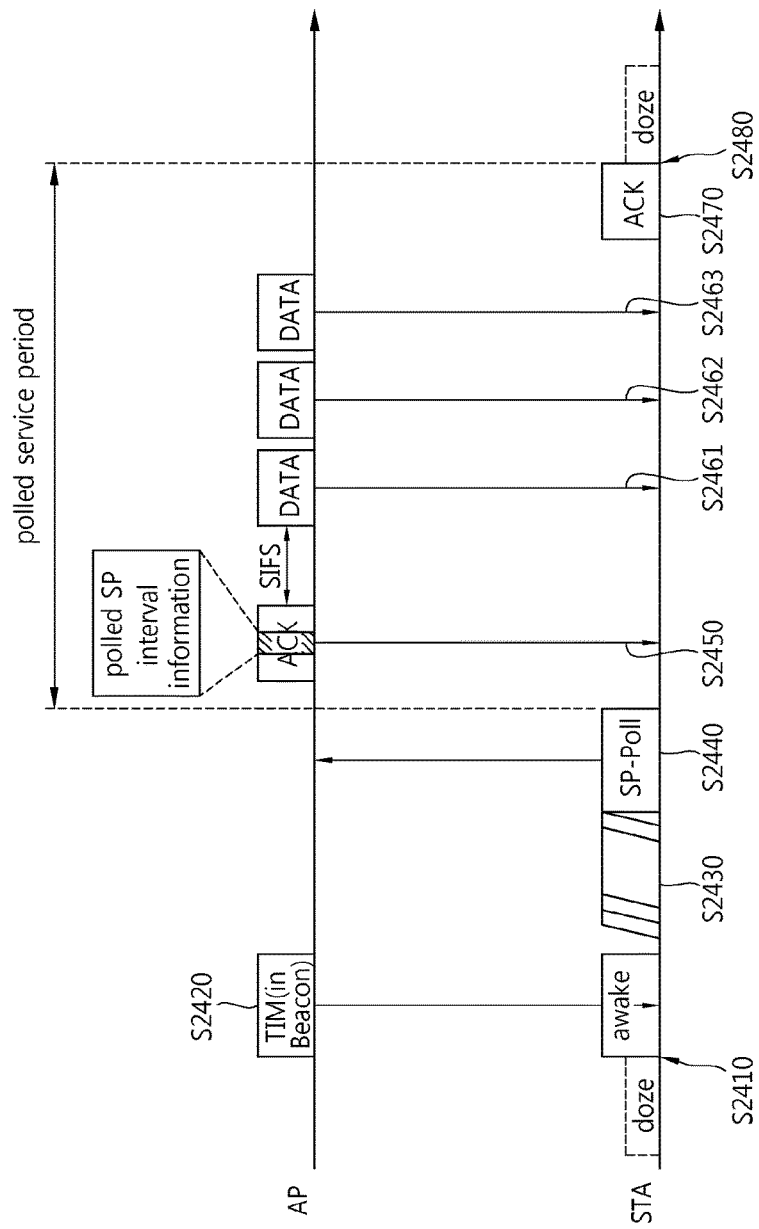
FIG. 24 is a view illustrating an example method of transmitting and receiving a frame by an STA operating in a power save mode according to another embodiment of the present invention.

FIG. 24 is a view illustrating an example method of transmitting and receiving a frame by an STA operating in a power save mode according to another embodiment of the present invention.

Referring to FIG. 24, the STA switches from the doze state to the awake state in order to receive a TIM element (S2410).

The STA receives a TIM element (S2420). The TIM element may be transmitted, included in a beacon frame. When receiving the TIM element, the terminal may determine whether a bufferable frame for itself is being buffered based on the AID of the STA and the bitmap sequence of the partial virtual bitmap field included in the TIM element.

When identifying that a bufferable frame is being buffered, the STA obtains a channel access authority through contention (S2430), and may send a request for transmission of a buffered frame to the AP through transmission of an SP-poll frame (S2440).

When receiving the SP-poll frame from the STA, the AP may send at least one PPDU to the STA in response to the SP-poll frame. In response to the SP-poll frame, the AP may transmit an ACK frame (S2450). The ACK frame may contain polled SP interval-related information. In this example, the polled SP interval-related information may be configured to indicate that the AP is supposed to transmit a buffered frame immediately subsequent to transmission of the ACK frame. In this case, by way of example, the polled SP interval field or response time field is set as 0 in order to enable the AP to immediately send a buffered frame without configuring a polled SP interval.

The AP sends at least one buffered frame to the STA an SIFS after transmission of the ACK frame (S2461, S2462, and S2463). The AP may send to the STA a plurality of PPDUs including at least one buffered frame and ACK frame during the polled service period initiated by the SP-poll frame.

The STA receives the ACK frame from the AP and may identify the time when the AP intends to send a buffered frame based on the included polled SP interval information. In the present example, since the polled SP interval information is set as 0, the STA may determine that the AP is to send a buffered frame after the ACK frame. Accordingly, the STA maintains the awake state after receiving the ACK frame, thereby waiting to receive a buffered frame.

When receiving the last buffered frame among the, at least one, buffered frame transmitted from the AP, the STA may send an ACK frame as a response to acknowledge reception of the buffered frame (S2470). Or, the STA may send an ACK frame in compliance with expiration of the duration of the polled service period indicated by the duration field of the SP-poll frame.

When sending out the ACK frame, the STA enters into the doze state (S2480).

Figure 25:
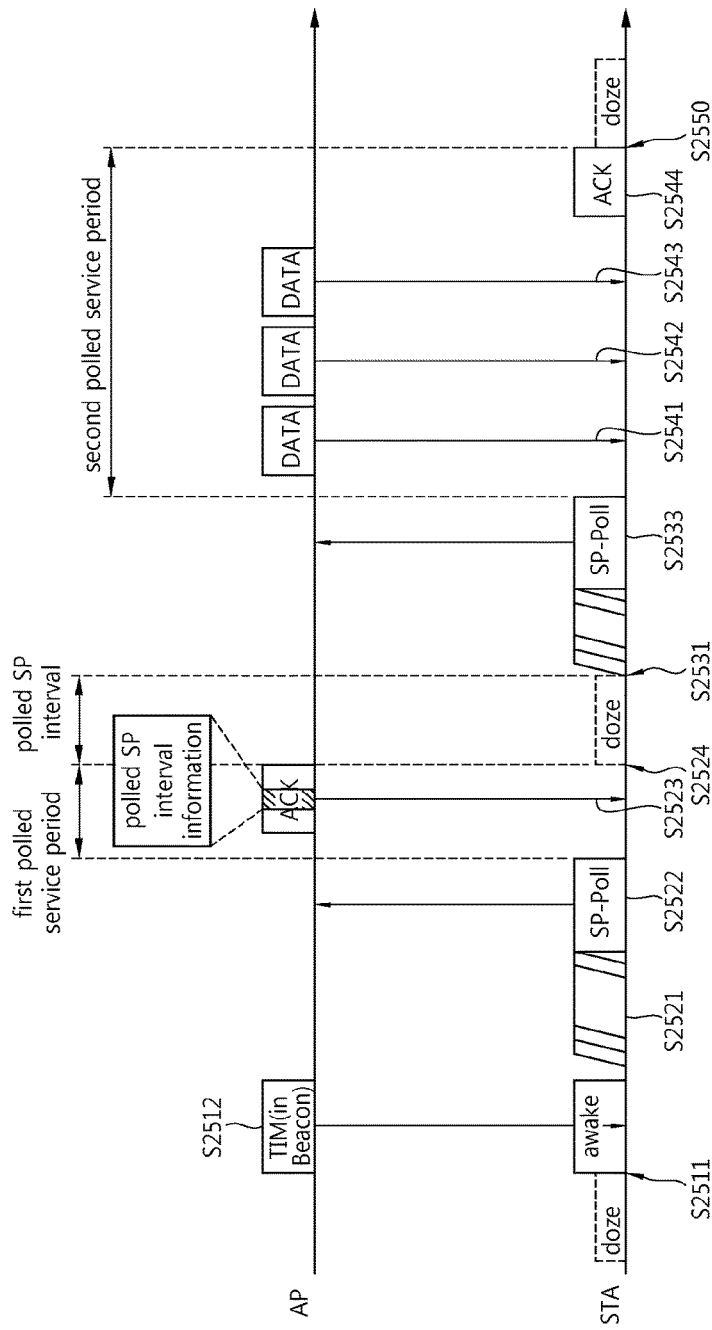
FIG. 25 is a view illustrating another example method of transmitting and receiving a frame by an STA operating in a power save mode according to another embodiment of the present invention.

FIG. 25 is a view illustrating another example method of transmitting and receiving a frame by an STA operating in a power save mode according to another embodiment of the present invention.

Referring to FIG. 25, the STA shifts from the doze state to the awake state so as to receive a TIM element (S2511).

The STA receives a TIM element (S2512). The TIM element may be transmitted, included in a beacon frame. When receiving the TIM element, the terminal may determine whether a bufferable frame for itself is being buffered based on the AID of the STA and the bitmap sequence of the partial virtual bitmap field included in the TIM element.

When identifying that a bufferable frame is being buffered, the STA obtains a channel access authority through contention (S2521) and may send a request for transmission of a buffered frame to the AP through transmission of an SP-poll frame (S2522). As the SP-poll frame is transmitted, a first polled service period may be initiated.

The AP may send at least one PPDU to the STA in response to the SP-poll frame from the AP. The AP may transmit an ACK frame in response to the SP-poll frame (S2523). The ACK frame may contain polled SP interval-related information. In this example, the polled SP interval-related information may indicate a time when the AP intends to initiate transmission of a buffered frame to the STA separately from the polled service period initiated by the SP-poll frame. As an example, the polled SP interval field or response time field may be set as a value indicating a time when the AP intends to initiate transmission of a buffered frame to the AP or a time when a new polled service period is intended to be initiated.

The STA receives the ACK frame and may be aware of the time when the AP intends to transmit a buffered frame based on the included polled SP interval information. Accordingly, the STA may enter into the doze state after receiving the ACK frame (S2524). In this case, the first polled service period initiated by transmission of the SP-poll frame may be ended.

The STA enters into the awake state at the time indicated by the polled SP interval information contained in the ACK frame (S2531) and acquires a channel access authority through contention (S2532).

When obtaining the channel access authority, the STA requests that the AP send a frame through transmission of an SP-poll frame (S2533). A second polled service period is initiated through transmission of the SP-poll frame.

The AP may send one or more buffered frames to the STA during the initiated second polled service period an SIFS after receiving the SP-poll frame (S2541, S2542, and S2543).

The duration of the second polled service period initiated by the STA transmitting the SP-poll frame (S2533) may be specified as the duration of the polled period described above in connection with FIG. 24. That is, the polled duration may be ended by the AP sending a buffered frame containing an EOSP field set as 1. Or, the second polled duration may be specified by the duration of the duration field of the SP-poll frame transmitted by the STA in step S2533.

The STA receives at least one or more frames from the AP and sends an ACK frame in response thereto (S2544). The ACK frame sent by the STA may be a block ACK as a response to acknowledge reception of at least one or more buffered frames. The STA, after sending out the ACK frame, may enter into the doze state (S2550).

Figure 26:
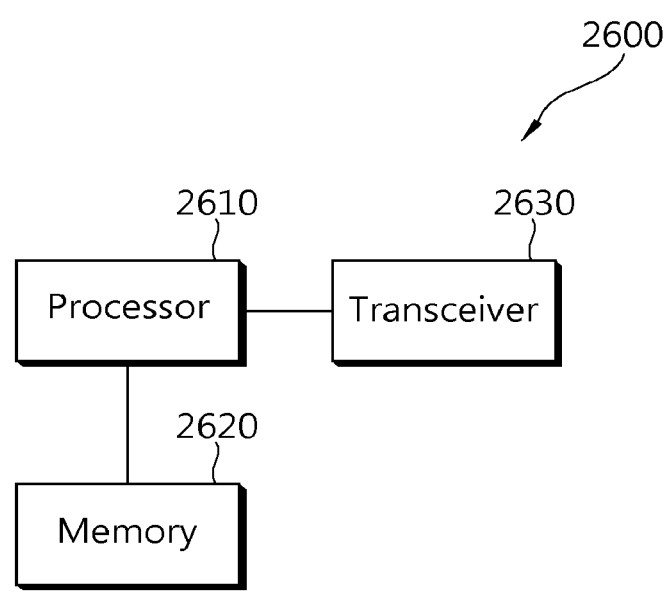
FIG. 26 is a block diagram illustrating a wireless device in which an embodiment of the present invention may be implemented.

FIG. 26 is a block diagram illustrating a wireless device in which an embodiment of the present invention may be implemented.

Referring to FIG. 26, the wireless device 2600 includes a processor 2610, a memory 2620, and a transceiver 2630.

The transceiver 2630 transmits and/or receives radio signals and implements the physical layer of IEEE 802.11.

The processor 2610 is operatively coupled with the transceiver 2630 and may be configured to transmit and receive a TIM element to determine whether a bufferable frame for itself is being buffered. The processor 2610 may be configured to transmit an SP-poll frame. The processor 2610 may be configured to transmit and/or receive at least one buffered frame during a service period initiated through the SP-poll frame. The processor 2610 may be configured to switch between the awake state and/or doze state depending on transmission and reception of a TIM element and a buffered frame. The processor 2610 may be configured to establish a polled service period during the course of an association procedure and/or scanning procedure. The processor 2610 may be configured to implement an embodiment of the present invention as described above in connection with FIGS. 16 to 25.

The processor 2610 and/or the transceiver 2630 may include an ASIC (Application-Specific Integrated Circuit), other chipset, a logic circuit, and/or a data processing device. When an embodiment is implemented in software, the above-described schemes may be realized in modules (processes or functions) for performing the above-described operations. The modules may be stored in the memory 2620 and may be executed by the processor 2610. The memory 2620 may be included in the processor 2610 or may be positioned outside the processor 2610 and may be operatively coupled with the processor 2610 via various known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for operating in a power save mode in a wireless local area network (WLAN), comprising:

transmitting, by an access point (AP), a beacon frame including a traffic indication map (TIM) to a receiving station (STA), the TIM indicating whether there is a buffered unit (BU) for the receiving STA;

receiving, by the AP, a poll frame from the receiving STA if the TIM indicates presence of the BU for the receiving STA, the poll frame including a duration field set by the receiving STA and an address field, wherein the duration field indicates a service period during which at least one frame is transmitted to the receiving STA from the AP and an ACK signal for the at least one frame is received by the AP, and wherein the address field including identification information of the receiving STA, and transmitting, by the AP, the at least one frame to the receiving STA.

2. The method of claim 1, wherein the at least one frame includes a field indicating whether the at least one frame is a last frame during the service period.

3. The method of claim 1, wherein the duration field is used by an unintended receiving station of the poll frame to set its network allocation vector (NAV) timer.

4. The method of claim 1, wherein the at least one frame is included a physical layer protocol data unit (PPDU) including a physical layer preamble and a medium access control (MAC) PDU.

5. Access point (AP) in a wireless local area network (WLAN), comprising:

a transceiver that receives and transmits radio signals; and a processor coupled to the transceiver that:

controls the transceiver to transmit a beacon frame including a traffic indication map (TIM) to a receiving station (STA), the TIM indicating whether there is a buffered unit (BU) for the receiving STA;

controls the transceiver to receive a poll frame from the receiving STA if the TIM indicates presence of the BU for the receiving STA, the poll frame including a duration field set by the receiving STA and an address field, wherein the duration field indicates a service period during which at least one frame is transmitted to the receiving STA from the AP and an ACK signal for the at least one frame is received by the AP, and wherein the address field including identification information of the receiving STA, and controls the transceiver to transmit the at least one frame to the receiving STA.

6. The AP of claim 5, wherein the at least one frame includes a field indicating whether the at least one frame is a last frame during the service period.

7. The AP of claim 5, wherein the duration field is used by an unintended receiving station of the poll frame to set its network allocation vector (NAV) timer.

8. The AP of claim 5, wherein the at least one frame is included a physical layer protocol data unit (PPDU) including a physical layer preamble and a medium access control (MAC) PDU.

* * * * *